United States Patent
Zhang et al.

(10) Patent No.: US 10,431,842 B2
(45) Date of Patent: Oct. 1, 2019

(54) AMMONIA-BASED THERMOELECTROCHEMICAL SYSTEMS AND METHODS

(71) Applicant: The Penn State Research Foundation, University Park, PA (US)

(72) Inventors: Fang Zhang, Beijing (CN); Jia Liu, Beijing (CN); Wulin Yang, State College, PA (US); Bruce E. Logan, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 15/518,082

(22) PCT Filed: Oct. 9, 2015

(86) PCT No.: PCT/US2015/054882
§ 371 (c)(1),
(2) Date: Apr. 10, 2017

(87) PCT Pub. No.: WO2016/057894
PCT Pub. Date: Apr. 14, 2016

(65) Prior Publication Data
US 2017/0250433 A1 Aug. 31, 2017

Related U.S. Application Data

(60) Provisional application No. 62/062,378, filed on Oct. 10, 2014.

(51) Int. Cl.
*H01M 8/18* (2006.01)
*H01M 8/22* (2006.01)
(Continued)

(52) U.S. Cl.
CPC .............. *H01M 8/182* (2013.01); *H01G 9/21* (2013.01); *H01M 4/38* (2013.01); *H01M 8/188* (2013.01);
(Continued)

(58) Field of Classification Search
CPC ........ H01M 8/182; H01M 8/222; H01M 4/38; H01M 8/188; H01M 14/00;
(Continued)

(56) References Cited

U.S. PATENT DOCUMENTS 3,470,029 A 9/1969 Meyers et al.
4,053,694 A * 10/1977 Gutridge ................. H01M 4/32
429/223

(Continued)

*Primary Examiner* — Maria Laios
*Assistant Examiner* — Kwang Han
(74) *Attorney, Agent, or Firm* — Julie K. Staple; Dinsmore & Shohl LLP

(57) ABSTRACT

Thermally regenerative ammonia-based battery systems and methods of their use to produce electricity are provided according to aspects described herein in which ammonia is added into an anolyte to charge the battery, producing potential between the electrodes. At the anode, metal corrosion occurs in the ammonia solution to form an amine complex of the corresponding metal, while reduction of the same metal occurs at the cathode. After the discharge of electrical power produced, ammonia is separated from the anolyte which changes the former anolyte to catholyte, and previous anode to cathode by deposition of the metal. When ammonia is added to the former catholyte to make it as anolyte, the previous cathode becomes the anode. This alternating corrosion/deposition cycle allows the metal of the electrodes to be maintained in closed-loop cycles, and waste heat energy is converted to electricity by regeneration of ammonia, such as by distillation.

18 Claims, 20 Drawing Sheets

(51) Int. Cl.
  *H01M 4/38* (2006.01)
  *H01M 14/00* (2006.01)
  *H01G 9/21* (2006.01)
  *H01M 4/36* (2006.01)
  *H01M 4/62* (2006.01)

(52) U.S. Cl.
  CPC ........... *H01M 8/222* (2013.01); *H01M 14/00* (2013.01); *H01M 4/366* (2013.01); *H01M 4/625* (2013.01); *H01M 2300/0002* (2013.01); *H01M 2300/0005* (2013.01); *Y02E 60/528* (2013.01)

(58) Field of Classification Search
  CPC ......... H01M 2300/0002; H01M 4/625; H01M 2300/0005; H01M 4/366; H01G 9/21; Y02E 60/528
  See application file for complete search history.

(56) References Cited

U.S. PATENT DOCUMENTS

| | | | |
|---|---|---|---|
| 4,292,378 A * | 9/1981 | Krumpelt | H01M 8/182 429/102 |
| 4,738,904 A | 4/1988 | Ludwig et al. | |
| 4,865,925 A | 9/1989 | Ludwig et al. | |
| 5,264,298 A * | 11/1993 | Townsend | H01G 9/21 429/102 |
| 5,470,669 A * | 11/1995 | Ludwig | H01M 8/182 136/206 |
| 6,631,073 B1 * | 10/2003 | Sakata | H01G 11/34 361/303 |
| 7,803,264 B2 | 9/2010 | Botte | |
| 8,753,761 B2 | 6/2014 | Esswein et al. | |

* cited by examiner

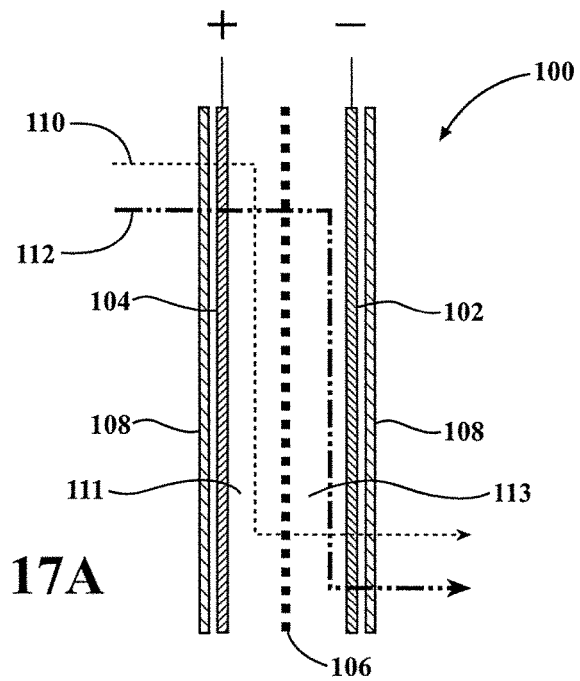
FIG. 17A
FIG. 17B
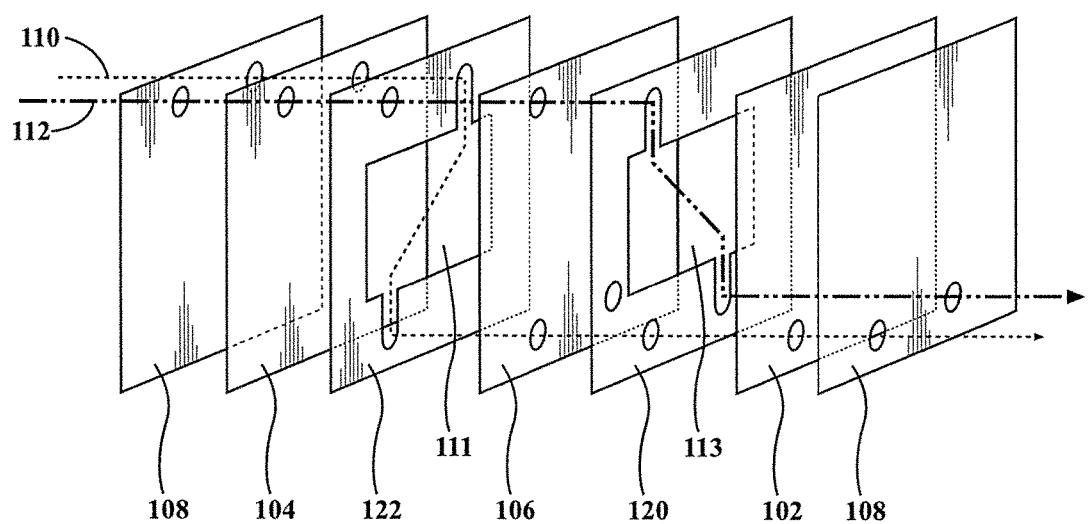

AMMONIA-BASED THERMOELECTROCHEMICAL SYSTEMS AND METHODS

REFERENCE TO RELATED APPLICATION

This application claims priority from U.S. Provisional Patent Application Ser. No. 62/062,378, filed Oct. 10, 2014, the entire content of which is incorporated herein by reference.

FIELD OF THE INVENTION

The present disclosure relates generally to thermoelectrical systems and methods for their use. According to specific aspects of the present disclosure, ammonia-based thermoelectrochemical systems and methods of their use are described.

BACKGROUND OF THE INVENTION

Low-grade heat utilization is advantageous for carbon-neutral electricity production and large amounts of low-grade thermal energy are available at many industrial sites and from geothermal and solar-based processes. Solid-state devices based on semiconductor materials have been extensively studied for direct thermal-electric energy conversion, but they are expensive and lack the capacity for energy storage.

SUMMARY OF THE INVENTION

Ammonia-based thermoelectrochemical systems are provided according to aspects of the present invention which include a reactor including a first electrode compartment and a second electrode compartment, a separator interposed between the first electrode compartment and the second electrode compartment, the reactor including first and second electrodes disposed in the first and second electrode compartments, respectively, both the first and the second electrode including at least one metal M selected from copper, silver, cobalt and nickel, the metal M in the first and the second electrode in solid form, wherein the first and second electrode both include the same metal M, a conductive conduit for electrons in electrical communication with the first electrode and the second electrode, the first and second electrode compartments containing an electrolyte including a solution of an ammonium salt and a salt of the at least one metal M, wherein the salt of the at least one metal M is a salt of the same metal M present in the first and second electrodes.

Ammonia-based thermoelectrochemical systems are provided according to aspects of the present invention which include a reactor including at least two cells, each cell including a first electrode compartment and a second electrode compartment; a separator interposed between the first electrode compartment and the second electrode compartment of each of the at least two cells, wherein the first electrode compartment of each of the at least two cells is in flow communication with each other first electrode compartment and a first electrolyte reservoir and wherein the second electrode compartment of each of the at least two cells is in flow communication with each other second electrode compartment and a second electrolyte reservoir; the reactor including first and second electrodes disposed in the first and second electrode compartments, respectively, of each of the at least two cells both the first and the second electrode of each of the at least two cells including at least one metal M selected from copper, silver, cobalt and nickel, the metal M in the first and the second electrode of each of the at least two cells in solid form, wherein the first and second electrode of each of the at least two cells both include the same metal M, a conductive conduit for electrons in electrical communication with the first electrode and the second electrode of each of the at least two cells, the first and second electrode compartments of each of the at least two cells containing an electrolyte including a solution of an ammonium salt and a salt of the at least one metal M, wherein the salt of the at least one metal M is a salt of the same metal M present in the first and second electrodes of each of the at least two cells.

According to an aspect of an ammonia-based thermoelectrochemical system of the present invention, the first and second electrodes include copper.

According to an aspect of an ammonia-based thermoelectrochemical system of the present invention, the first and second electrodes include silver.

According to an aspect of an ammonia-based thermoelectrochemical system of the present invention, the first and second electrodes include cobalt.

According to an aspect of an ammonia-based thermoelectrochemical system of the present invention, the first and second electrodes include nickel.

According to an aspect of an ammonia-based thermoelectrochemical system of the present invention, the first and second electrodes consist essentially of copper.

According to an aspect of an ammonia-based thermoelectrochemical system of the present invention, the first and second electrodes consist essentially of silver.

According to an aspect of an ammonia-based thermoelectrochemical system of the present invention, the first and second electrodes consist essentially of cobalt.

According to an aspect of an ammonia-based thermoelectrochemical system of the present invention, the first and second electrodes consist essentially of nickel.

According to an aspect of an ammonia-based thermoelectrochemical system of the present invention, the first and/or second electrodes include particles of granular activated carbon coated with copper.

According to an aspect of an ammonia-based thermoelectrochemical system of the present invention, the first and/or second electrodes include particles of granular activated carbon coated with silver.

According to an aspect of an ammonia-based thermoelectrochemical system of the present invention, the first and/or second electrodes include particles of granular activated carbon coated with cobalt.

According to an aspect of an ammonia-based thermoelectrochemical system of the present invention, the first and/or second electrodes include particles of granular activated carbon coated with nickel.

According to an aspect of an ammonia-based thermoelectrochemical system of the present invention, the reactor further includes one or more seals to inhibit entry of oxygen into the reactor.

Methods of use of an ammonia-based thermoelectrochemical system according to aspects of the present invention include providing an ammonia-based thermoelectrochemical system, the system including a first electrode compartment and a second electrode compartment, a separator interposed between the first electrode compartment and the second electrode compartment, the reactor including first and second electrodes disposed in the first and second electrode compartments, respectively, both the first and the second electrode including at least one metal M selected from copper, silver, cobalt and nickel, the metal M in the first and the second electrode in solid form, wherein the first and second electrode both include the same metal M, a conductive conduit for electrons in electrical communication with the first electrode and the second electrode, the first and second electrode compartments containing an electrolyte including a solution of an ammonium salt and a salt of the at least one metal M, wherein the salt of the at least one metal M is a salt of the same metal M present in the first and second electrodes;

adding ammonia to the first electrode compartment, thereby promoting reactions in the first and second electrode compartments:

first electrode compartment: $M\ (s) + x\ NH_3\ (aq) \rightarrow M(NH_3)_x^{y+} + ye-$, second electrode compartment: $M^{y+}\ (aq) + ye- \rightarrow M\ (s)$, where y is one or two, wherein the reaction in the first electrode compartment produces a first spent electrolyte and the reaction in the second electrolyte compartment produces a second spent electrolyte, the reactions producing an electrical current.

Methods of use of an ammonia-based thermoelectrochemical system according to aspects of the present invention include providing an ammonia-based thermoelectrochemical system, the system including a first electrode compartment and a second electrode compartment, a separator interposed between the first electrode compartment and the second electrode compartment, the reactor including first and second electrodes disposed in the first and second electrode compartments, respectively, both the first and the second electrode including at least one metal M selected from copper, silver, cobalt and nickel, the metal M in the first and the second electrode in solid form, wherein the first and second electrode both include the same metal M, a conductive conduit for electrons in electrical communication with the first electrode and the second electrode, the first and second electrode compartments containing an electrolyte including a solution of an ammonium salt and a salt of the at least one metal M, wherein the salt of the at least one metal M is a salt of the same metal M present in the first and second electrodes;

adding ammonia to the first electrode compartment, thereby promoting reactions in the first and second electrode compartments:

first electrode compartment: $M\ (s) + x\ NH_3\ (aq) \rightarrow M(NH_3)_x^{y+} + ye-$, second electrode compartment: $M^{y+}\ (aq) + ye- \rightarrow M\ (s)$, where y is one or two, wherein the reaction in the first electrode compartment produces a first spent electrolyte and the reaction in the second electrolyte compartment produces a second spent electrolyte, the reactions producing an electrical current; and further including heating the first spent electrolyte to volatilize and remove ammonia, thereby regenerating the electrolyte and regenerating the electrode in the first electrode compartment; and then adding ammonia to the second spent electrolyte, thereby promoting reactions in the first electrode and second electrode compartments:

first electrode compartment: $M\ (s) + x\ NH_3\ (aq) \rightarrow M(NH_3)_x^{y+} + ye-$, second electrode compartment: $M^{y+}\ (aq) + ye- \rightarrow M\ (s)$ where y is one or two, wherein the reaction in the first electrode compartment produces a first spent electrolyte and the reaction in the second electrolyte compartment produces a second spent electrolyte, the reactions producing an electrical current. Optionally, the steps are performed additional times.

Methods of use of an ammonia-based thermoelectrochemical system according to aspects of the present invention include providing an ammonia-based thermoelectrochemical system, the system including at least two cells, each cell including a first electrode compartment and a second electrode compartment; a separator interposed between the first electrode compartment and the second electrode compartment, wherein the first electrode compartment of each of the at least two cells is in flow communication with each other first electrode compartment and a first electrolyte reservoir and wherein the second electrode compartment of each of the at least two cells is in flow communication with each other second electrode compartment and a second electrolyte reservoir; the reactor including first and second electrodes disposed in the first and second electrode compartments, respectively, of each of the at least two cells, both the first and the second electrode of each of the at least two cells including at least one metal M selected from copper, silver, cobalt and nickel, the metal M in the first and the second electrode of each of the at least two cells in solid form, wherein the first and second electrode of each of the at least two cells both include the same metal M, a conductive conduit for electrons in electrical communication with the first electrode and the second electrode of each of the at least two cells, the first and second electrode compartments of each of the at least two cells containing an electrolyte including a solution of an ammonium salt and a salt of the at least one metal M, wherein the salt of the at least one metal M is a salt of the same metal M present in the first and second electrodes of each of the at least two cells; adding ammonia to the first electrode compartments of each of the at least two cells, thereby promoting reactions in the first and second electrode compartments of each of the at least two cells;

first electrode compartments: $M\ (s) + x\ NH_3\ (aq) \rightarrow M(NH_3)_x^{y+} + ye-$, second electrode compartments: $M^{y+}\ (aq) + ye- \rightarrow M\ (s)$ where y is one or two, wherein the reaction in the first electrode compartments of each of the at least two cells produces a first spent electrolyte and the reaction in the second electrolyte compartments of each of the at least two cells produces a second spent electrolyte, the reactions producing an electrical current.

Methods of use of an ammonia-based thermoelectrochemical system according to aspects of the present invention include providing an ammonia-based thermoelectrochemical system, the system including at least two cells, each cell including a first electrode compartment and a second electrode compartment; a separator interposed between the first electrode compartment and the second electrode compartment, wherein the first electrode compartment of each of the at least two cells is in flow communication with each other first electrode compartment and a first electrolyte reservoir and wherein the second electrode compartment of each of the at least two cells is in flow communication with each other second electrode compartment and a second electrolyte reservoir; the reactor including first and second electrodes disposed in the first and second electrode compartments, respectively, of each of the at least two cells, both the first and the second electrode of each of the at least two cells including at least one metal M selected from copper, silver, cobalt and nickel, the metal M in the first and the second electrode of each of the at least two cells in solid form, wherein the first and second electrode of each of the at least two cells both include the same metal M, a conductive conduit for electrons in electrical communication with the first electrode and the second electrode of each of the at least two cells, the first and second electrode compartments of each of the at least two cells containing an electrolyte including a solution of an ammonium salt and a salt of the at least one metal M, wherein the salt of the at least one metal M is a salt of the same metal M present in the first and second electrodes of each of the at least two cells; adding ammonia to the first electrode compartments of each of the at least two cells, thereby promoting reactions in the first and second electrode compartments of each of the at least two cells;

first electrode compartments: 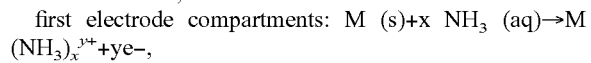

second electrode compartments: $M^{y+}$ (aq)+ye-→M (s)

where y is one or two, wherein the reaction in the first electrode compartments of each of the at least two cells produces a first spent electrolyte and the reaction in the second electrolyte compartments of each of the at least two cells produces a second spent electrolyte, the reactions producing an electrical current; and further including heating the first spent electrolyte to volatilize and remove ammonia, thereby regenerating the electrolyte and regenerating the electrode in the first electrode compartments of each of the at least two cells; adding ammonia to the second spent electrolyte, thereby promoting reactions in the first and second electrode compartments of each of the at least two cells:

first electrode compartment: 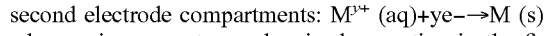
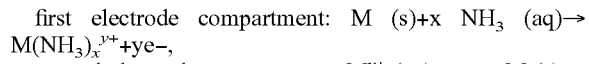

second electrode compartment: $M^{y+}$ (aq)+ye-→M (s)

where y is one or two, wherein the reaction in the first electrode compartments of each of the at least two cells produces a first spent electrolyte and the reaction in the second electrolyte compartments of each of the at least two cells produces a second spent electrolyte, the reactions producing an electrical current. Optionally, the steps are performed additional times.

According to an aspect of the present invention, the metal M is copper and the electrolyte includes an aqueous solution of ammonium nitrate ($NH_4NO_3$) and copper nitrate ($Cu(NO_3)_2$).

According to an aspect of the present invention, the metal M is silver and the electrolyte includes an aqueous solution of ammonium nitrate ($NH_4NO_3$) and silver nitrate ($AgNO_3$).

According to an aspect of the present invention, the metal M is nickel and the electrolyte includes an aqueous solution of ammonium nitrate ($NH_4NO_3$) and nickel nitrate ($Ni(NO_3)_2$).

According to an aspect of the present invention, the first and/or second electrode is a flow electrode and the first electrode compartment is in flow communication with a first electrolyte reservoir and/or the second electrode compartment is in flow communication with a second electrolyte reservoir.

Methods of use of an ammonia-based thermoelectrochemical system according to aspects of the present invention optionally include sparging the electrolyte with a non-oxygen containing gas to remove oxygen and inhibit corrosion of electrodes in the reactor.

BRIEF DESCRIPTION OF THE DRAWINGS

FIG. 17A is a diagram showing a one cell thermally-regenerative ammonia-based battery in flow configuration;

FIG. 17B is an exploded view of the diagram of FIG. 17A showing a one cell thermally-regenerative ammonia-based battery in flow configuration;

DETAILED DESCRIPTION OF THE INVENTION

Figure 1A:
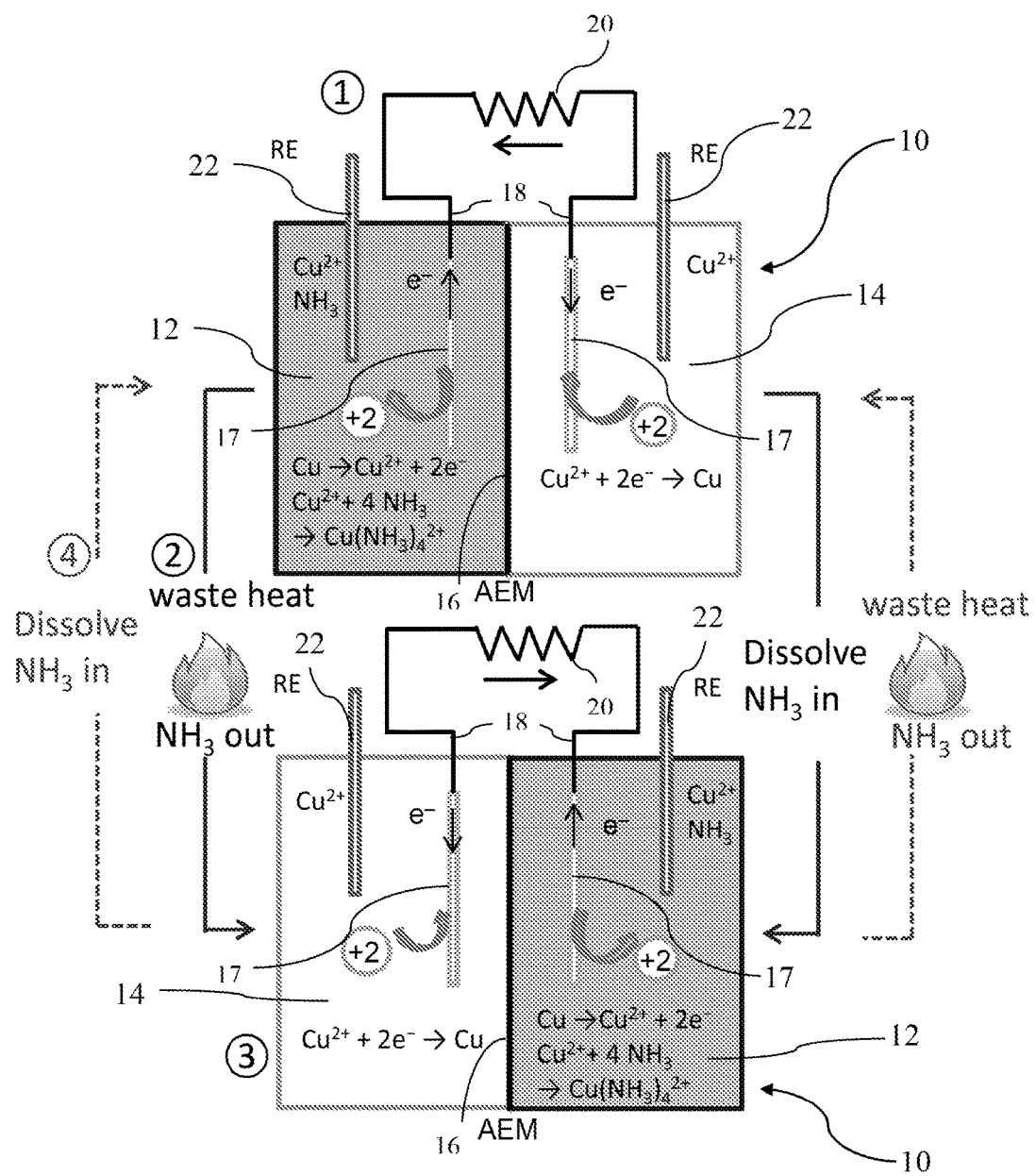
FIG. 1A is a schematic illustration of a thermally regenerative ammonia-based battery (TRAB) and method to convert waste heat into electricity.

The singular terms "a," "an," and "the" are not intended to be limiting and include plural referents unless explicitly stated otherwise or the context clearly indicates otherwise.

Ammonia-based thermoelectrochemical systems and methods are provided according to the present invention.

Ammonia-based thermoelectrochemical systems according to aspects of the present invention include a reaction chamber having a wall defining an interior of the reaction chamber and an exterior of the reaction chamber, a first electrode compartment and a second electrode compartment, a separator is disposed between the first electrode compartment and the second electrode compartment, the reactor comprising first and second electrodes disposed in the first and second electrode compartments, respectively, both the first and the second electrode comprising at least one metal M selected from copper, silver and nickel, the metal M in the first and the second electrode in solid form, wherein the first and second electrode both comprise the same metal M, a conductive conduit for electrons in electrical communication with the first electrode and the second electrode is present along with a load, the first and second electrode compartments containing an electrolyte comprising a solution of an ammonium salt and a salt of the at least one metal M, wherein the salt of the at least one metal M is a salt of the same metal M present in the first and second electrodes.

One or more channels in the reaction chamber and/or between cells of a multi-cell system for inlet and outlet of materials, such as electrolytes and/or reactants, such as ammonia, is present according to aspects of the present invention.

One or more seals for inhibiting unwanted fluid or gas movement into or out of the reaction chamber and/or between cells of a multi-cell system are optionally disposed in or adjacent to the one or more channels.

The metal M is preferably copper, silver, nickel or cobalt. Mixtures or alloys of any two or more metals selected from: copper, silver, nickel and cobalt may be included in electrodes of an inventive system.

Both electrodes include the same metal M.

The electrolytes in both the first electrode compartment and the second electrode compartment include a salt of the same metal M present in the electrodes.

According to an aspect of the present invention, both electrodes include or consist essentially of, copper and the electrolytes in both the first electrode compartment and the second electrode compartment include a copper salt. A non-limiting example of a copper salt included in the electrolytes is copper(II) nitrate, copper(II) sulfate, copper (II) chloride.

According to an aspect of the present invention, both electrodes include or consist essentially of, silver and the electrolytes in both the first electrode compartment and the second electrode compartment include a silver salt. A non-limiting example of a silver salt included in the electrolytes is silver(I) nitrate.

According to an aspect of the present invention, both electrodes include or consist essentially of, nickel and the electrolytes in both the first electrode compartment and the second electrode compartment include a nickel salt. A non-limiting example of a nickel salt included in the electrolytes is nickel(II) nitrate, nickel(II) sulfate, nickel(II) chloride According to an aspect of the present invention, both electrodes include or consist essentially of, cobalt and the electrolytes in both the first electrode compartment and the second electrode compartment include a cobalt salt. A non-limiting example of a cobalt salt included in the electrolytes is cobalt(II) nitrate, cobalt(II) sulfate, cobalt(II) chloride.

Optionally, the first and/or second electrodes comprise particles of granular activated carbon coated with the metal M and the electrolytes in both the first electrode compartment and the second electrode compartment include a corresponding salt of the metal M. Thus, for example, the first and/or second electrodes comprise particles of granular activated carbon coated with copper, silver, nickel and/or cobalt and the electrolytes in both the first electrode compartment and the second electrode compartment include a corresponding salt of copper, silver, nickel and/or cobalt.

One or more additional salts such as sodium or potassium salts, illustratively sodium nitrate, sodium sulfate, potassium nitrate or potassium sulfate, is optionally included in an electrolyte to increase the solution conductivity, but they are not active species in the electrode reactions.

Methods of use of an ammonia-based thermoelectrochemical system include providing an ammonia-based thermoelectrochemical system, the system comprising a first electrode compartment and a second electrode compartment, a separator interposed between the first electrode compartment and the second electrode compartment, the reactor comprising first and second electrodes disposed in the first and second electrode compartments, respectively, both the first and the second electrode comprising at least one metal M selected from copper, silver and nickel, the metal M in the first and the second electrode in solid form, wherein the first and second electrode both comprise the same metal M, a conductive conduit for electrons in electrical communication with the first electrode and the second electrode, the first and second electrode compartments containing an electrolyte comprising a solution of an ammonium salt and a salt of the at least one metal M, wherein the salt of the at least one metal M is a salt of the same metal M present in the first and second electrodes; adding ammonia to the first electrode compartment, thereby promoting reactions in the first and second electrode compartments:

first electrode compartment: M (s)+x NH$_3$ (aq)→ M(NH$_3$)$_x^{y+}$+ye−, second electrode compartment: M$^{y+}$ (aq)+ye−→M (s)

where y is one or two.

The reaction in the first electrode compartment produces a first spent electrolyte and the reaction in the second electrolyte compartment produces a second spent electrolyte, the reactions producing an electrical current.

A preferred option includes heating the first spent electrolyte to volatilize and remove ammonia, thereby regenerating the electrolyte. Ammonia is then added to the second spent electrolyte, thereby regenerating the electrodes and promoting reactions in the first electrode and second electrode compartments:

first electrode compartment: M (s)+x NH$_3$ (aq)→ M(NH$_3$)$_x^{y+}$+ye−, second electrode compartment: M$^{y+}$ (aq)+ye−→M (s)

where y is one or two.

wherein the reaction in the first electrode compartment produces a first spent electrolyte and the reaction in the second electrolyte compartment produces a second spent electrolyte, the reactions producing an electrical current. This may be repeated one or more additional times.

Electrolytes

Active Species

The active species in the electrolyte are metal ions (catholyte) and ammonia (anolyte). In examples described herein, identical metal salt concentrations in both the anolyte and catholyte to illustrate that voltage is generated due to ammonia concentration gradient and not metal concentration gradient, but this is not a necessary requirement. During the operation, the metal ion in the anolyte is concentrated due to metal corrosion, while the metal ion in the catholyte is depleted. Thus, according to aspects of methods of the present invention, the starting anolyte solution contains few metal ions, preferably zero, while in the starting catholyte metal ion concentration should approach its solubility limit to maximize the energy density of the TRAB. Table I lists examples of salts included in electrolytes and their solubilities.

TABLE I

Solubility limit of salts at 25° C. and 60° C.

| | Solubility (mass percentage of solute, %)[1] | | Solubility (estimated molarity[2], M) | |
|---|---|---|---|---|
| | 25° C. | 60° C. | 25° C. | 60° C. |
| AgNO$_3$ | 70.1 | 81.7 | 4.5 | 5.3 |
| Co(NO$_3$)$_2$ | 50.8 | 62.6 | 3.1 | 3.8 |
| CoSO$_4$ | 27.7 | 35.9 | 2.0 | 2.5 |
| CoCl$_2$ | 36.0 | 43.5 | 3.0 | 3.7 |
| Cu(NO$_3$)$_2$ | 59.2 | 64.5 | 3.5 | 3.8 |
| CuSO$_4$ | 18.0 | 28.8 | 1.2 | 2.0 |
| CuCl$_2$ | 43.1 | 47.2 | 3.5 | 3.9 |
| NiSO$_4$ | 28.8 | 35.8 | 2.0 | 2.5 |
| Ni(NO$_3$)$_2$ | 49.8 | 61.0 | 3.0 | 3.7 |
| NiCl$_2$ | 40.3 | 45.0 | 3.4 | 3.8 |
| NH$_4$NO$_3$ | 68.0 | 80.8 | 9.3 | 11.1 |

[1]Data obtained from the *CRC Handbook of Chemistry and Physics*. The solubility values are expressed as mass percent of solute, 100 w$_2$ = 100 m$_2$/(m$_1$ + m$_2$), where m$_2$ is the mass of solute and in the mass of water.
[2]Molarity is estimated as c = 10 ρw/M, where c is the molar concentration, ρ the density of the solution, w the mass percentage of solute, and M the molecular weight of the solute, by assuming ρ equals 1.1 g cm$^{-3}$.

Ammonia is highly soluble in water, with a solubility limit ~20 M at 25° C. According to the chemical formula of the metal ammine complex [M(NH$_3$)$_x^{y+}$], the anolyte ammonia concentration needs to be at least x times of the metal ion concentration in the catholyte.

Supporting Electrolyte

Figure 7A:
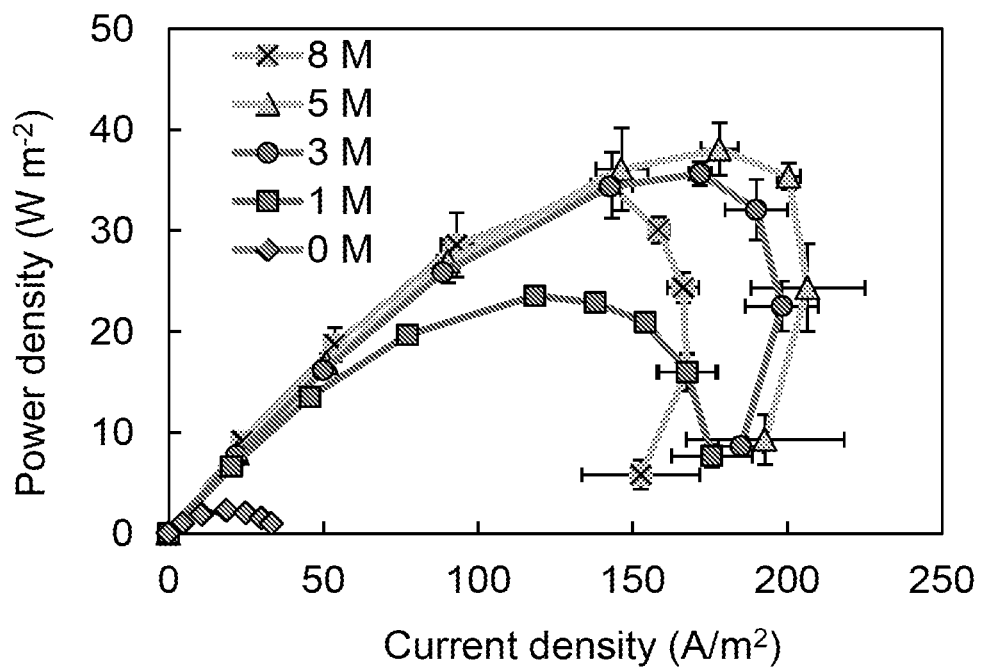
FIG. 7A is a graph showing power production using 0-8 M $NH_4NO_3$ as the supporting electrolyte, with 0.1 M Cu(II) in both electrolyte and 1 M ammonia in the anolyte; both catholyte and anolyte were in static conditions; error bars represent standard deviations based on measurements with duplicate reactors; cathode concentration polarization occurred at high current density range with 3-8 M $NH_4NO_3$, resulting in power overshoot with these conditions.
Figure 7B:
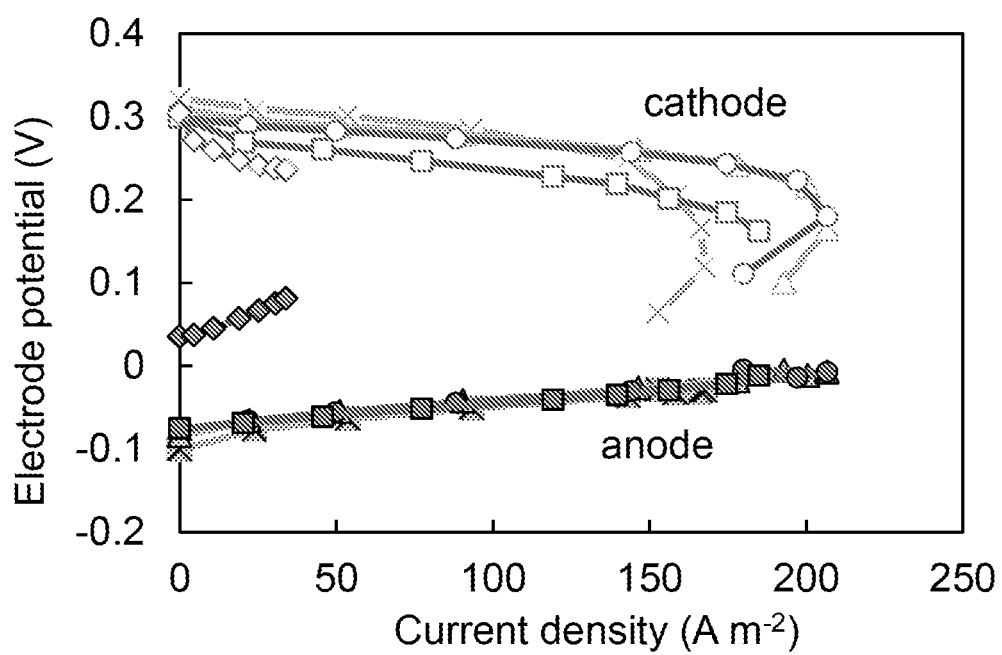
FIG. 7B is a graph showing power production using 0-8 M $NH_4NO_3$ as the supporting electrolyte, with 0.1 M Cu(II) in both electrolyte and 1 M ammonia in the anolyte; both catholyte and anolyte were in static conditions; error bars represent standard deviations based on measurements with duplicate reactors; cathode concentration occurred at high current density range with 3-8 M NH$_4$NO$_3$, resulting in power overshoot with these conditions; line symbols in FIG. 7B indicate solution conditions as shown in 7A, with open symbols used for the cathode potentials and filled symbols for the anode potentials.
Figure 9A:
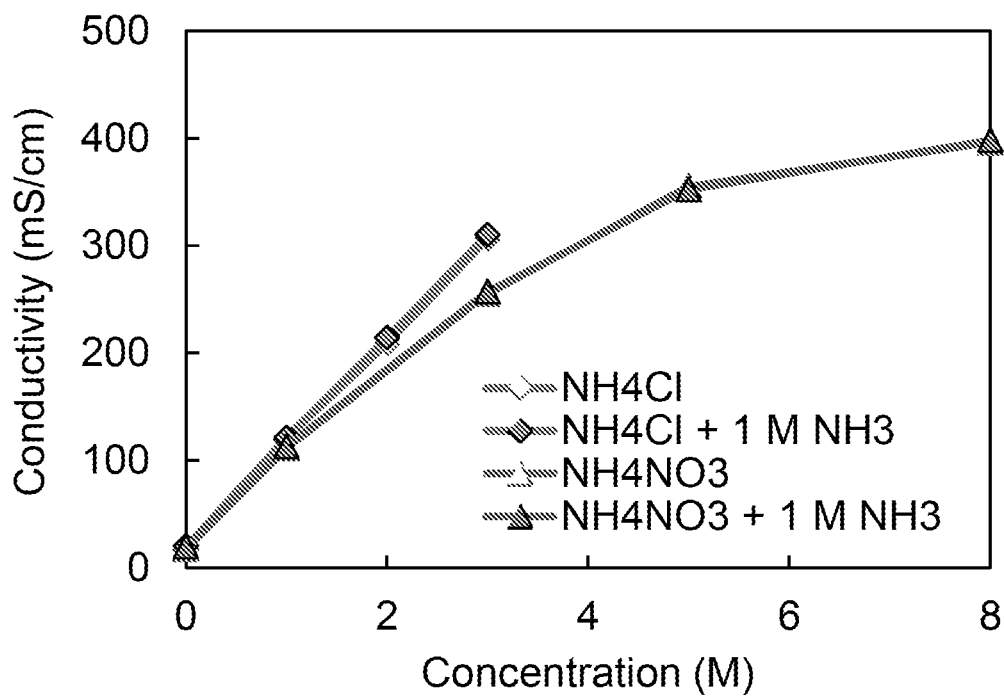
FIG. 9A is a graph showing conductivity of 0.1 M Cu(NO$_3$)$_2$ solutions with various concentrations of ammonium salts, with or without addition of 1 M ammonia in the solutions; given the same molar concentration of salt, although NH$_4$Cl had a higher conductivity than NH$_4$NO$_3$, the formation of CuCl$_4^-$ complex ions prevented the use of NH$_4$Cl as the supporting electrolyte.
Figure 9B:
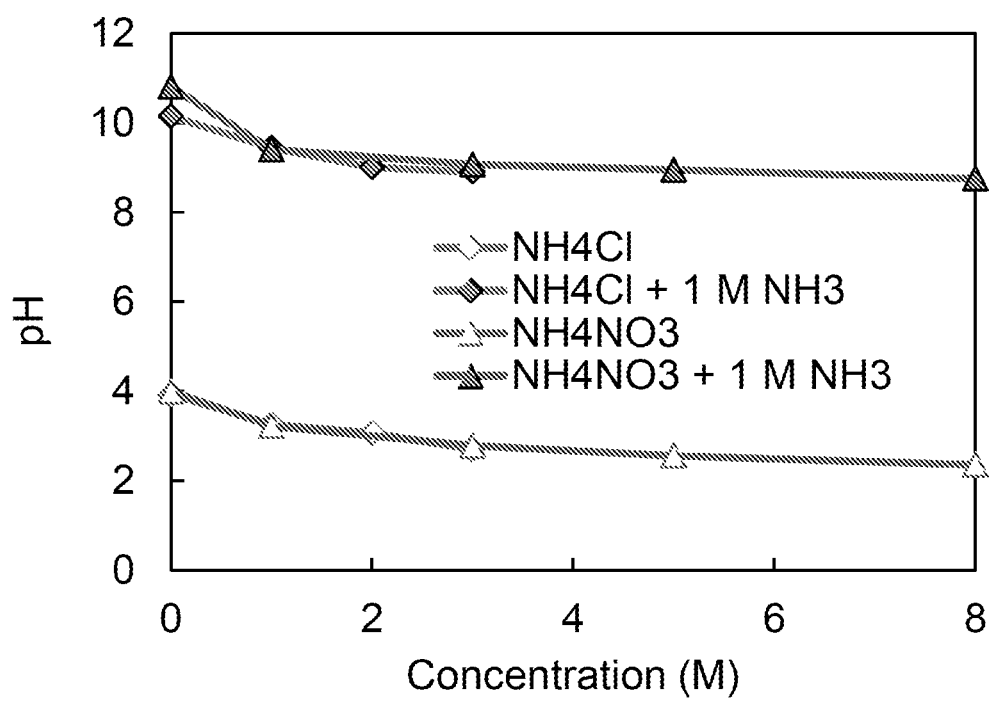
FIG. 9B is a graph showing pH of 0.1 M Cu(NO$_3$)$_2$ solutions with various concentrations of ammonium salts, with or without addition of 1 M ammonia in the solutions; given the same molar concentration of salt, although NH$_4$Cl had a higher conductivity than NH$_4$NO$_3$, the formation of CuCl$_4^-$ complex ions prevented the use of NH$_4$Cl as the supporting electrolyte.

The role of supporting electrolyte is to increase the solution conductivity and decrease the ohmic loss (internal resistance) of the TRAB. In examples described herein, increasing the supporting electrolyte (NH$_4$NO$_3$) from 0 M to 8 M greatly increased the solution conductivity from 19 to 398 mS cm-1 (FIG. 9), resulting in a great enhancement of power production from 2.3 to 57 W m-2 (FIG. 7). When the active electrolyte concentration is high, the supporting electrolyte concentration can be correspondingly decreased.

Optionally, the first and/or second electrode is a flow electrode.

One or more supports, gaskets, spacers and/or seals may be optionally included to inhibit movement of fluids or gases between adjacent electrode compartments of systems of the present invention.

Embodiments of systems of the present invention are configured such that electrolytes and/or reactants, such as ammonia, are introduced in batches or as a continual flow. Electrolytes can be introduced and subsequently removed when spent, i.e. the reactor can be operated in batch mode. Alternatively, electrolytes can continuously flow into the respective electrode compartments. Ammonia can continuously be flowed in to one of the electrode compartments in a continuous flow configuration.

One or more channels for inlet and outlet of materials, such as electrolytes and/or reactants, such as ammonia, can be included for continual flow or batch operation of devices of the present invention.

The volumes of the compartments can be varied to suit specific needs.

Thus according to embodiments of the present invention, ammonia is introduced into an electrolyte in a first electrode compartment as a liquid or gas.

Ammonia is volatilized from the spent electrolyte at a temperature in the range of about 30° C.-95° C., such as in the range from 40° C.-80° C., thereby regenerating the electrolyte from spent first electrolyte. Vacuum may be applied to the spent electrolyte during the process of volatilization of ammonia such that decreased heat is required and the volatilization occurs at lower temperatures.

The heat used to volatilize the ammonia can be waste heat from any reaction or process. Thus, processes and systems according to such embodiments allow for capture of waste heat energy through regeneration of the spent first electrolyte.

Alternatively, the heat used can be drawn from conventional sources. In a further alternative, the heat can be generated by a secondary process such as from water in solar energy cells. Low-grade thermal energy (temperatures <130° C.) is available at many industrial sites and from geothermal and solar-based processes.

The volatilized ammonia is captured and is preferably reused by addition to the first electrolyte to promote the reaction in the reactor.

Reactions conditions in the reactor are those which promote the desired reactions. In general, reaction conditions include a temperature in the range of 0-100° C., such as in the range of 20-85° C., or in the range of 23-75° C.

Optionally, dissolved oxygen is removed from the electrolyte in the first and/or second electrode compartments to inhibit non-electrochemical electrode corrosion and to enhance the anodic coulombic efficiency.

Thus, in one option, oxygen is removed and/or excluded from a TRAB according to aspects of the present invention. For example, the reactor is sealed to prevent oxygen leakage into the reactor and/or the electrolyte can be sparged with nitrogen or other non-oxygen containing gas to remove oxygen.

Optionally, ammonium ion concentration is in an amount which inhibits ammonia dissociation to inhibit precipitation during electrolyte regeneration.

According to preferred aspects of systems and methods described herein, acetonitrile is excluded from electrolytes.

FIG. 1A shows a schematic diagram of a single TRAB cell including anode and cathode chambers, 12 and 14, respectively, separated by an anion exchange membrane 16 (AEM). Electrodes 17 are shown connected by wires 18 to an external load, resistor 20. Optional reference electrodes 22 are shown inserted at the two sides of the electrodes and outside the current path to monitor the electrode potentials.

Four steps of a closed-cycle method for harvesting waste heat are shown in FIG. 1A including ① power production with the initial Cu(II) solution and the Cu(II) ammonia complex solution (formed by addition of ammonia into the copper solution in the left chamber which becomes the negative terminal i.e. anode); ② Regeneration of the electrolyte by using waste heat to remove ammonia from the anode chamber; ③ power production with regenerated electrolyte, which also regenerates the electrode; and where ammonia is added to the chamber on the right which now becomes the negative terminal i.e. anode; and ④ regeneration of the electrolyte by waste heat to remove ammonia from the anode chamber. FIG. 1A depicts a single TRAB cell including Cu electrodes and electrolytes, although other electrodes and electrolytes may be used as described herein.

Figure 1B:
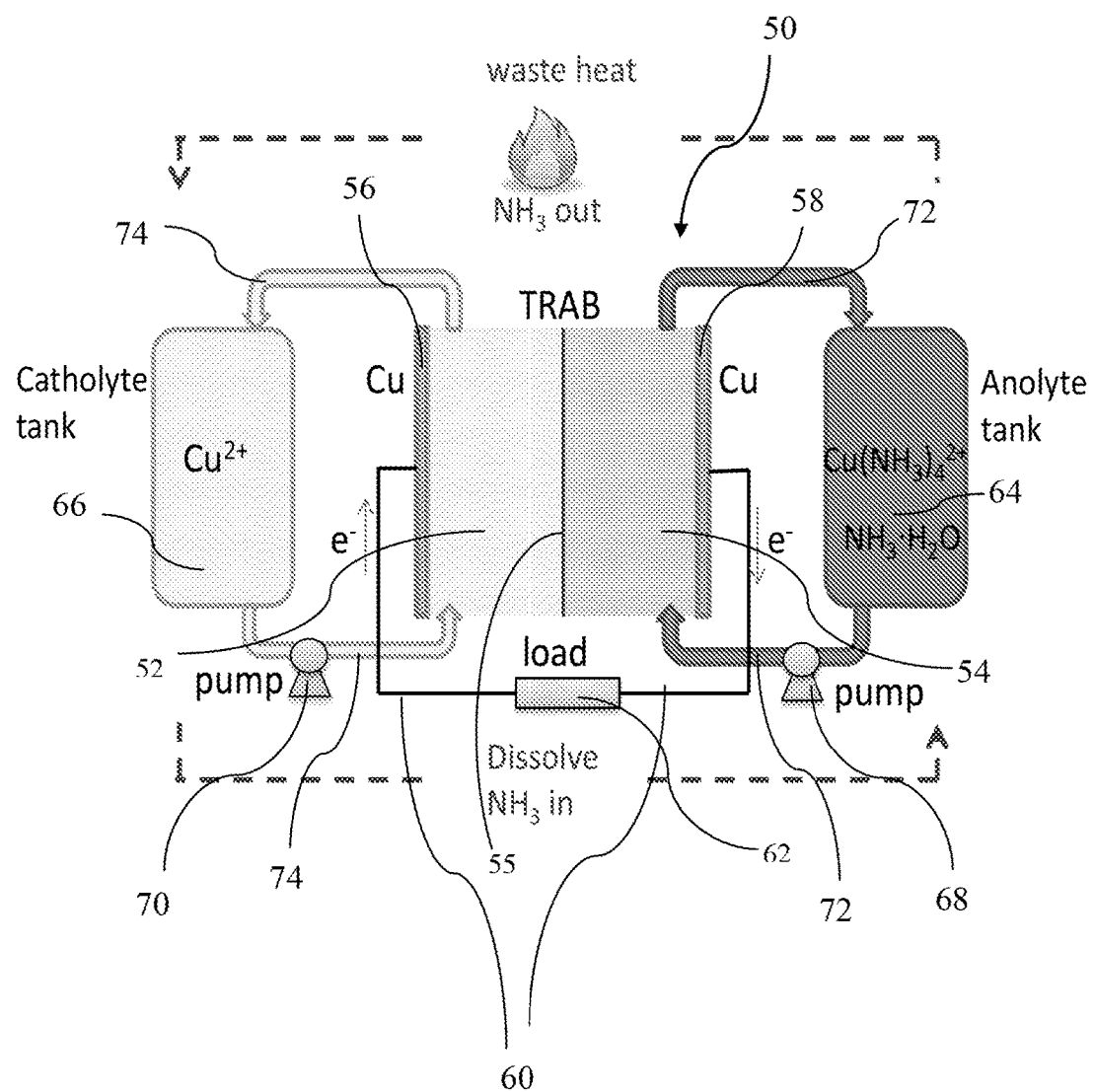
FIG. 1B is a schematic illustration of a TRAB operated in continuous flow mode.
Figure 1C:
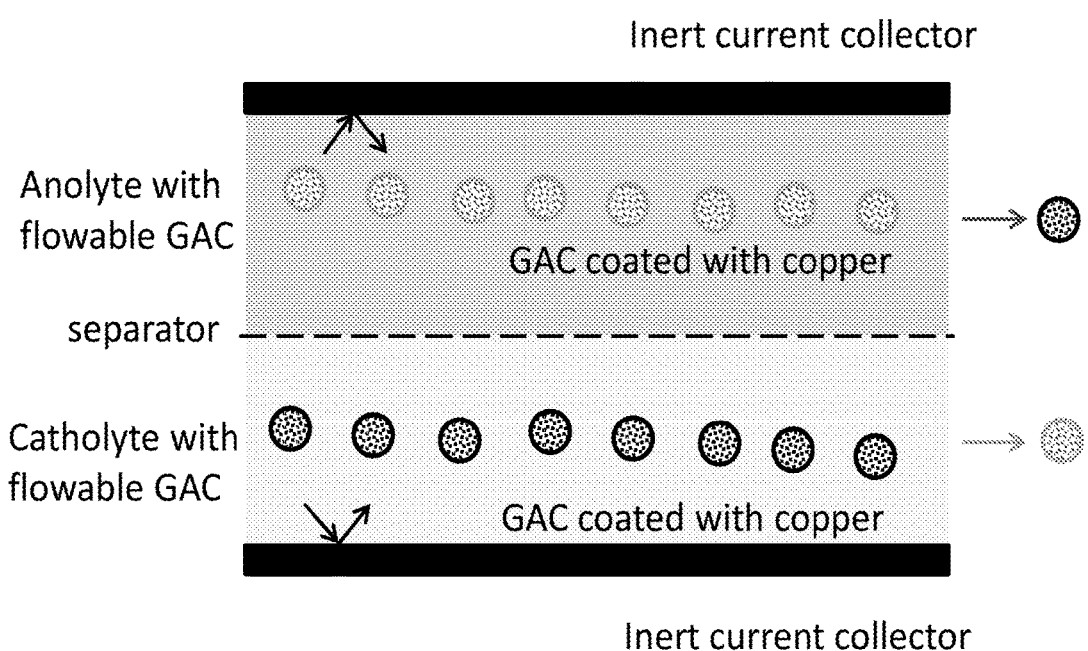
FIG. 1C is a schematic illustration of a TRAB with flow electrodes.

FIG. 1B shows a schematic diagram of a single TRAB cell in a system configured for continuous flow mode of operation. The illustrated continuous flow TRAB system 50 includes anode and cathode chambers, 52 and 54, respectively, separated by an anion exchange membrane 55. Electrodes 56 and 58 are shown connected by wires 60 to an external load 62. The first electrode compartment 52 is in flow communication with a first electrolyte reservoir, catholyte tank 66, and/or the second electrode compartment 54 is in flow communication with a second electrolyte reservoir, anolyte tank 64 as indicated generally in FIG. 1B. Pumps 68 and 70 are shown for circulation of electrolyte in flow channels 72 and 74, respectively. FIG. 1B depicts a single TRAB cell in a system configured for continuous flow mode of operation illustratively using Cu electrodes and electrolytes, although other electrodes and electrolytes may be used as described herein.

FIG. 17A is a diagram showing a one cell TRAFB (thermally-regenerative ammonia-based battery in flow configuration) 100. Cathode 102 and anode 104 are shown as copper electrodes in the illustrated configuration but may be silver, nickel or cobalt containing electrodes as described for other configurations of thermally-regenerative ammonia-based batteries described herein. An anion exchange membrane (AEM) 106 is shown separating an anode chamber 111 containing anolyte from a cathode chamber 113 containing catholyte. An anolyte flow path 110 and a catholyte flow path 112 are shown. Endplates 108 are depicted.

FIG. 17B is an exploded view of the diagram of FIG. 17A showing a one cell TRAFB 100. Cathode 102 and anode 104 are shown adjacent endplates 108. A spacer 120 is positioned between the cathode 102 and the AEM 106 and a spacer 122 is positioned between the anode 104 and the AEM 106. An anolyte flow path 110 and a catholyte flow path 112 are shown.

Figure 18:
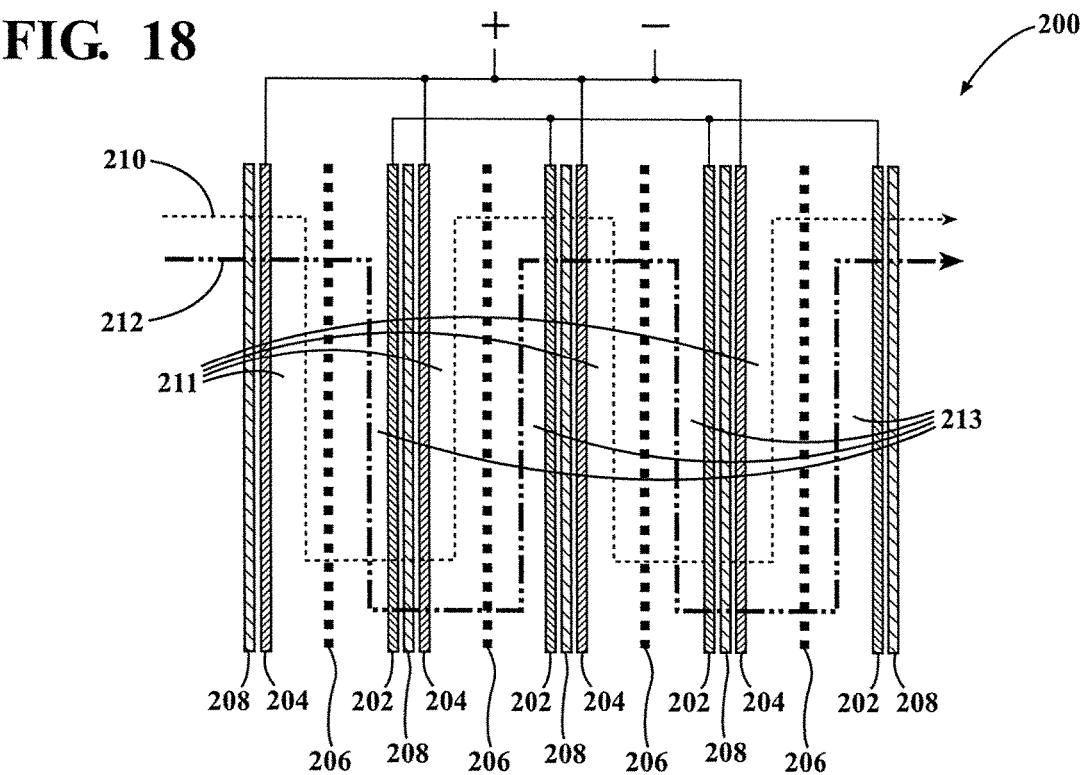
FIG. 18 is a diagram showing a multi-cell thermally-regenerative ammonia-based battery in flow configuration.

FIG. 18 is a diagram showing a multi-cell TRAFB 200. Cathodes 202 and anodes 204 are shown as copper electrodes in the illustrated configuration but may be silver, nickel or cobalt containing electrodes as described for other configurations of thermally-regenerative ammonia-based batteries described herein. Anion exchange membranes (AEM) 206 are shown separating each of four anode chambers 211 containing anolyte from each of four cathode chambers 213 containing catholyte. An anolyte flow path 210 and a catholyte flow path 212 are shown. Endplates 208 are depicted.

Figure 19:
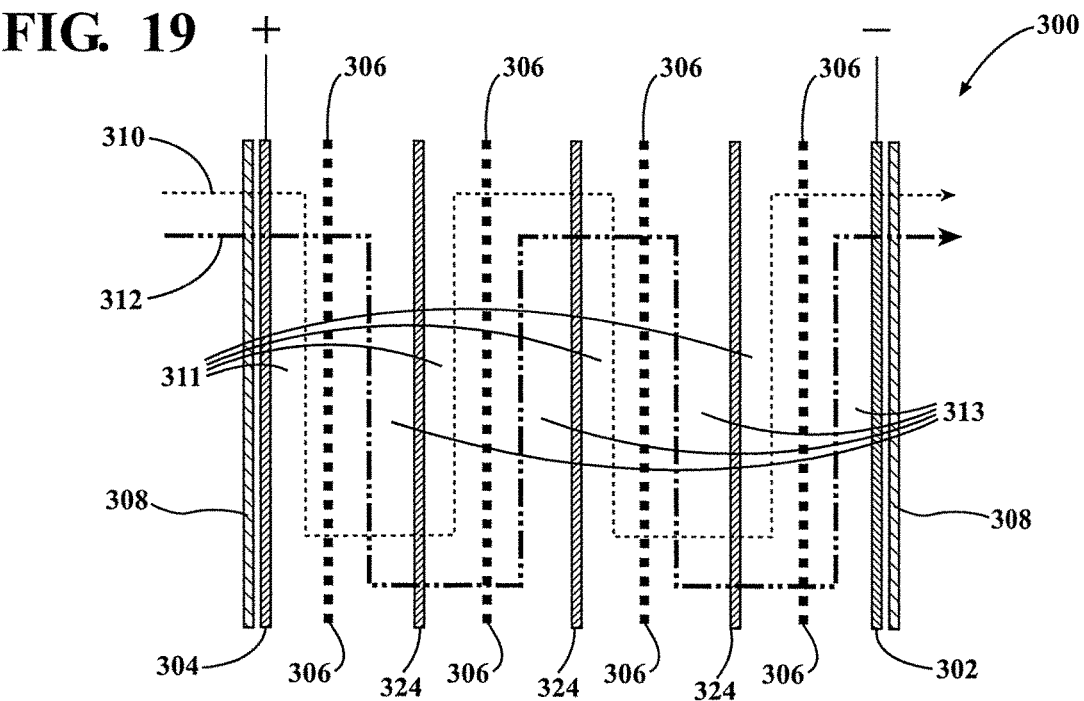
FIG. 19 is a diagram showing a multi-cell thermally-regenerative ammonia-based battery in flow configuration.

FIG. 19 is a diagram showing a multi-cell TRAFB 300. Cathode 302 and anode 304, along with bipolar electrodes 324 (which function as both anode and cathode), are shown as copper electrodes in the illustrated configuration but may be silver, nickel or cobalt containing electrodes as described for other configurations of thermally-regenerative ammonia-based batteries described herein. Anion exchange membranes (AEM) 306 are shown separating anode chambers 311 containing anolyte from cathode chambers 313 containing catholyte. An anolyte flow path 310 and a catholyte flow path 312 are shown. Endplates 308 are depicted.

Electrodes Generally

Electrodes included in a system according to the present invention include at least one metal M, wherein the metal M is solid copper, silver, cobalt or nickel. Included electrodes are electrically conductive. Exemplary included conductive electrode materials may be, but are not limited to, carbon paper, carbon cloth, carbon felt, carbon wool, carbon foam, carbon black, carbon mesh, activated carbon, graphite, porous graphite, graphite powder, graphite granules, graphite fiber, a conductive polymer, a conductive metal, and combinations of any of these wherein the electrode includes at least one metal M, wherein the metal M is solid copper, silver, cobalt or nickel. An electrically conductive material, such as a metal mesh or screen current collector can be included in the electrode in order to increase overall electrical conductivity of the electrode.

According to aspects of the present invention, an electrode includes at least one metal M, wherein the metal M is solid copper, solid silver, solid cobalt or solid nickel coated onto particles of granular activated carbon which flow freely within an electrode compartment and which are charged or discharged by flow contact with a current collector positioned in the electrode compartment.

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 90 degrees with respect to the longest dimension of the cathode.

Electrodes of various sizes and shapes may be included in an inventive system.

Electrodes may be positioned in various ways to achieve a desired spacing between the electrodes.

Optionally, an inventive system is provided which includes more than one anode and/or more than one cathode. For example, from 1-100 additional anodes and/or cathodes may be provided. The number and placement of one or more anodes and/or one or more electrodes may be considered in the context of the particular application.

Separators

A separator is included according to aspects of an inventive system which separates the first electrode compartment from the second electrode compartment, inhibiting the mixing of metal species between anolyte and catholyte solutions.

An included separator can include an anion exchange material or a non-ion-selective separator material.

An anion exchange material is permeable to one or more selected anions. Anion exchange material is disposed between the anode compartment and the saline material compartment forming an anion selective barrier between the anode compartment and the saline material compartment. According to embodiments of the present invention, the anode exchange material is in the form of an anion exchange membrane.

Anion exchange materials include, for example, quaternary ammonium-functionalized poly(phenylsulfone); and quaternary ammonium-functionalized divinylbenzene cross-linked poly(styrene). Further examples include AMI ion exchange membranes made by Membranes International, Inc. New Jersey, USA. Tokuyama Corporation, Japan, also produces a range of anion exchange membranes such as AHA and A201 that can be included in a system according to embodiments of the invention. Fumatech, Germany, anion exchange membranes, FAA, can be included in a system according to embodiments of the invention.

Non-ion-selective separator materials include, for example, ultra-high molecular weight polyethylene (UHMWPE), polyvinyl alcohol (PVA) and polyvinylidene fluoride (PVDF). Thus, a ultra-high molecular weight polyethylene (UHMWPE), polyvinyl alcohol (PVA) or polyvinylidene fluoride (PVDF) membrane is included as a separator according to aspects of inventive systems.

General Aspects of Ammonia-Based Thermoelectrochemical Systems

Reaction Chamber and Associated Components

A channel is included defining a passage from the exterior of the reaction chamber to the interior in particular embodiments. More than one channel may be included to allow and/or regulate flow of materials into and out of the reaction chamber. For example, one or more channels may be included to allow for inflow of electrolyte and/or reactant and/or outflow of a spent electrolyte In a particular embodiment of a continuous flow configuration, a channel may be included to allow flow of a substance into a reaction chamber and a separate channel may be used to allow outflow of a substance from the reaction chamber. More than one channel may be included for use in any inflow or outflow function.

A regulator device, such as a valve, may be included to further regulate flow of materials into and out of the reaction chamber. Further, a cap or seal is optionally used to close a channel. For example, where a fuel cell is operated remotely or as a single use device such that no additional materials are added, a cap or seal is optionally used to close a channel.

A pump may be provided for enhancing flow of electrolytes and/or reactants into and/or out of a reaction chamber.

Embodiments of inventive compositions and methods are illustrated in the following examples. These examples are provided for illustrative purposes and are not considered limitations on the scope of inventive compositions and methods.

EXAMPLES

Example 1

Design, Construction, and Operation

A single TRAB cell consisted of anode and cathode chambers, 12 and 14, respectively, separated by an anion exchange membrane 16 (AEM; Selemion AMV, Asashi glass, Japan; effective surface area of 7 cm$^2$) as shown in FIG. 1A. The two chambers 12 and 14, each 4 cm long and 3 cm in diameter, were constructed from 4-cm cubes of Lexan. The electrodes 17 were made of copper mesh (50×50 mesh, McMaster-Carr, OH; 0.8 cm×2 cm with a projected surface area of 1.6 cm$^2$, weight of 0.2365±0.0004 g) connected using copper wires 18 to an external resistor 20. Ag/AgCl reference electrodes 22 (+211 mV versus SHE; RE-5B; BASi) were inserted at the two sides of the copper electrodes that were outside the current path to monitor the electrode potentials as shown in FIG. 1A. The cathode chamber was stirred using a stir bar (6.4×15.9 mm, magnetic egg-shaped stir bars, VWR; 500 rpm) (except as noted otherwise) while the anolyte was not mixed.

The electrolyte was 0.1 M Cu(NO$_3$)$_2$ and 5 M NH$_4$NO$_3$ (Sigma Aldrich), except as noted, that were dissolved in deionized water. To charge the TRAB, 2 M ammonium hydroxide (Sigma-Aldrich, 5 N solution) was added to the anolyte to form the copper ammonia complex ion, although ammonia gas could also be used. In some experiments, the concentration of Cu(II) was varied from 0.05 M to 2 M, and the ammonia concentration varied from 1 M to 3 M, all in 5 M NH$_4$NO$_3$, to examine the effect of reactant concentrations on power production. In some experiments, NH$_4$NO$_3$ concentration was varied from 3 to 8 M to examine the effect of supporting electrolyte concentration on power production. The electrolyte conductivity increased from 256 mS/cm (3 M NH$_4$NO$_3$) to 397 mS/cm (8 M NH$_4$NO$_3$). The final pH of anolyte solutions decreased from 9.1 (3 M) to 8.7 (8 M), while the catholyte pH decreasing from 2.8 (3 M) to 2.4 (8 M) with the increasing NH$_4$NO$_3$ concentration, see FIG. 9.

In order to determine TRAB performance over multiple cycles, the cells were operated with a fixed 2.6Ω external resistance for a whole batch cycle, which ended when the voltage was <20 mV. The effluent from two chambers was separately collected. The anolyte effluent was heated at 50° C. to distill the ammonia out to regenerate the catholyte for the next batch. Ammonia (in the form of ammonium hydroxide solution) was added to the catholyte effluent to form the new anolyte. All experiments were run in duplicate at room temperature (20-30° C.).

Calculations and Measurements

Voltage across the external resistor (U), and electrode potentials versus the respective Ag/AgCl reference electrode (E$_{cat}$, E$_{an}$) were recorded at 1 min intervals using a data acquisition system (Agilent, Santa Clara, Calif.) connected to a personal computer. Polarization tests were performed by switching the external resistance every 5 min from 100.6 (or 40.6) to 1.6 Ω in decreasing order. Both current density (I=U/RA) and power density (P=U$^2$/RA) were normalized to a single electrode projected surface area (1.6 cm$^2$). Error bars indicate standard deviations for measurements using the duplicate reactors.

During the regeneration cycle tests, the total charge was calculated by integrating the current-time profile (Q=∫It), and total energy was calculated by integrating the power-time profile (W=∫UIt). Energy density was calculated by normalizing the total produced energy in one cycle by the total electrolyte volume (60 mL). Coulombic efficiency of the electrode was calculated as the ratio between actual produced charge and theoretical amount of charge based on the mass change of the electrode. For each piece of the electrode, the mass was measured 3 times using an analytical balance, and average values were used for the calculation. The energy stored in the solution was determined based on the AG of the overall cell reaction: Cu$^{2+}$+4 NH$_3$ (aq)→Cu(NH$_3$)$_4^{2+}$ (aq). The activities of the chemical species were estimated using the Visual MINTEQ software. At 25° C., with 0.1 M Cu(II) in both electrolytes and 2 M anolyte ammonia, the ΔG was −74.9 kJ mol$^{-1}$, for a theoretical energy density in the starting solutions of 1040 Wh m$^{-3}$ (normalized to the total electrolyte volume of 60 mL). As Cu(II) concentrations increased in the regenerated electrolyte, the theoretical energy density was calculated based on the Cu(II) concentration in the regenerated electrolyte that was estimated based on charge production assuming all catholyte Cu(II) was reduced in that cycle. The energy recovery was then calculated as the ratio between actual energy density produced in one cycle and the theoretical energy density.

Figure 10:
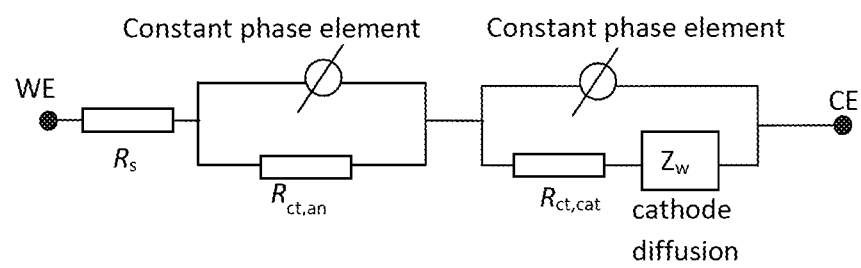
FIG. 10 is a diagram showing equivalent circuit for whole cell impedance analysis; the reaction resistance was the sum of anode charge transfer resistance ($R_{ct,an}$), cathode charge transfer resistance (Rct,cat), and diffusion resistance (Rd,cat)

Electrochemical impedance spectroscopy (EIS) was performed with whole cells set at 0.2 V, to compare the cell ohmic resistance and overall reaction resistance with different concentrations of NH$_4$NO$_3$. All EIS tests were performed over a frequency range of 100 kHz to 10 mHz with a sinusoidal perturbation of 10 mV amplitude. The EIS spectra were fitted into the equivalent circuit as described in FIG. 10, to identify the solution/membrane resistance (R$_s$), charge transfer and diffusion resistance of the two electrodes. The reaction resistance (R$_{rxn}$) was defined as the sum of the charge transfer and diffusion resistances.

Results

Power Production as a Function of Concentrations of Ammonia and Cu(II)

Figure 2A:
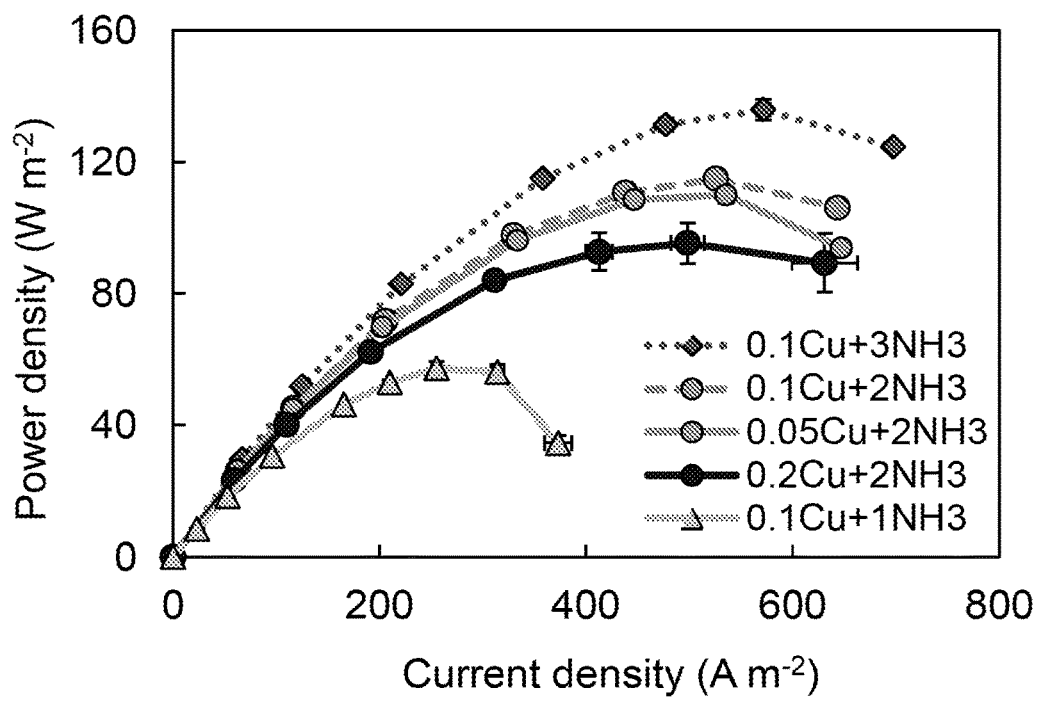
FIG. 2A is a graph showing power production with various Cu(II) and ammonia concentrations, using 5 M $NH_4NO_3$ as the supporting electrolyte; error bars represent standard deviations based on measurements with duplicate reactors.
Figure 2B:
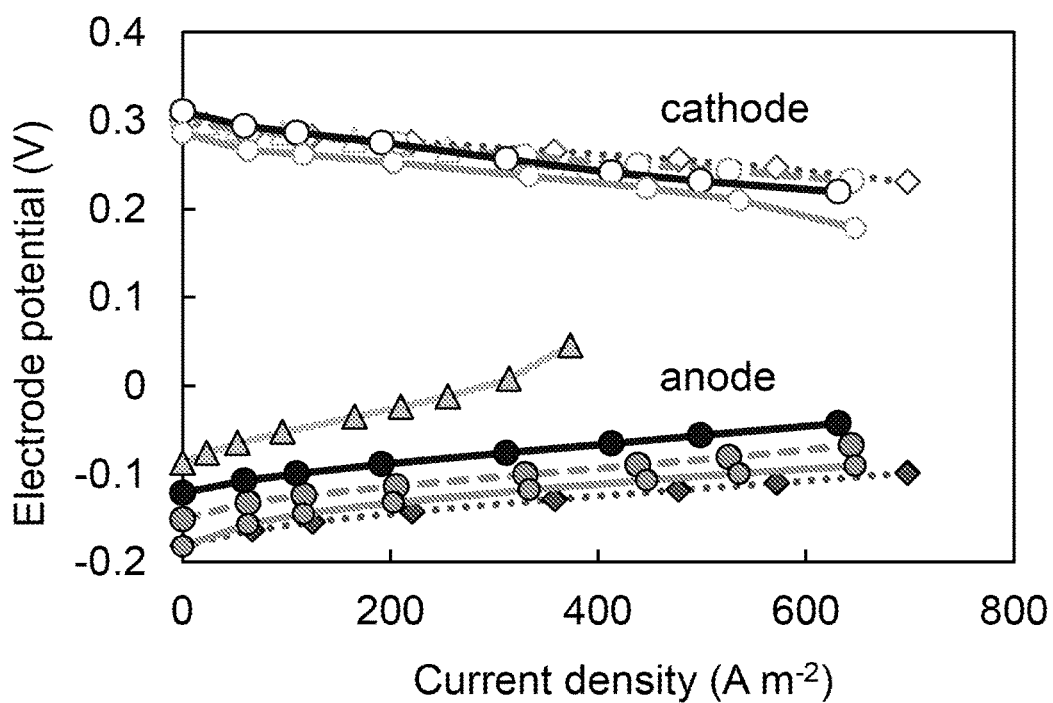
FIG. 2B is a graph showing electrode potentials with various Cu(II) and ammonia concentrations, using 5 M $NH_4NO_3$ as the supporting electrolyte; error bars represent standard deviations based on measurements with duplicate reactors.

The performance of the TRAB was examined over a range of NH$_3$ and Cu(II) concentrations in a 5 M NH$_4$NO$_3$ supporting electrolyte. Increasing the anodic NH$_3$ concentration from 1 M to 3 M improved the power production from 57±2 W m$^{-2}$ to 136±3 W m$^{-2}$ as shown in FIG. 2A, mainly due the enhancement of anode performance as shown in FIG. 2B. Line symbols in FIG. 2B indicate solution conditions as shown in 2A, with open symbols used for the cathode potentials and filled symbols for the anode potentials. Improved anode performance was consistent with the Nernst equation, Eq S1, as the anode potentials were more negative at increased NH$_3$ concentrations. Increasing NH$_3$ concentration from 1 to 3 M slightly reduced cathode overpotentials, although the reason for this decrease was not clear.

Nernst equations for calculating electrode potentials:

$$\text{Anode: } E = E^0 - \frac{RT}{2F}\ln\frac{[a(\text{NH}_3)]^4}{a(\text{Cu}(\text{NH}_3)_4^{2+})} \quad (S1)$$

$$\text{Cathode: } E = E^0 - \frac{RT}{2F}\ln\frac{1}{a(\text{Cu}^{2+})} \quad (S2)$$

Changing Cu(II) concentrations of the electrolytes affected both anode and cathode potentials. A Cu(II) concentration of 0.1 M produced the highest power density of 115±1 W m$^{-2}$, with a 2 M NH$_3$ anolyte as shown in FIG. 2. Reducing the Cu(II) concentration to 0.05 M slightly decreased power production to 110±2 W m$^{-2}$, as the more negative cathode potentials was offset by the more negative anode potentials. According to the Nernst equation, Eq S2, increasing the Cu(II) concentration should lead to more positive potentials for both electrodes, resulting in little change in performance. However, when the Cu(II) concentration was increased to 0.2 M, power decreased to 95±6 W m$^{-2}$. This decrease was mainly due to the deterioration of the anode performance, as the cathode potentials were not appreciably affected as shown in FIG. 2.

Power Production with Different Concentrations of the Supporting Electrolyte

Figure 3A:
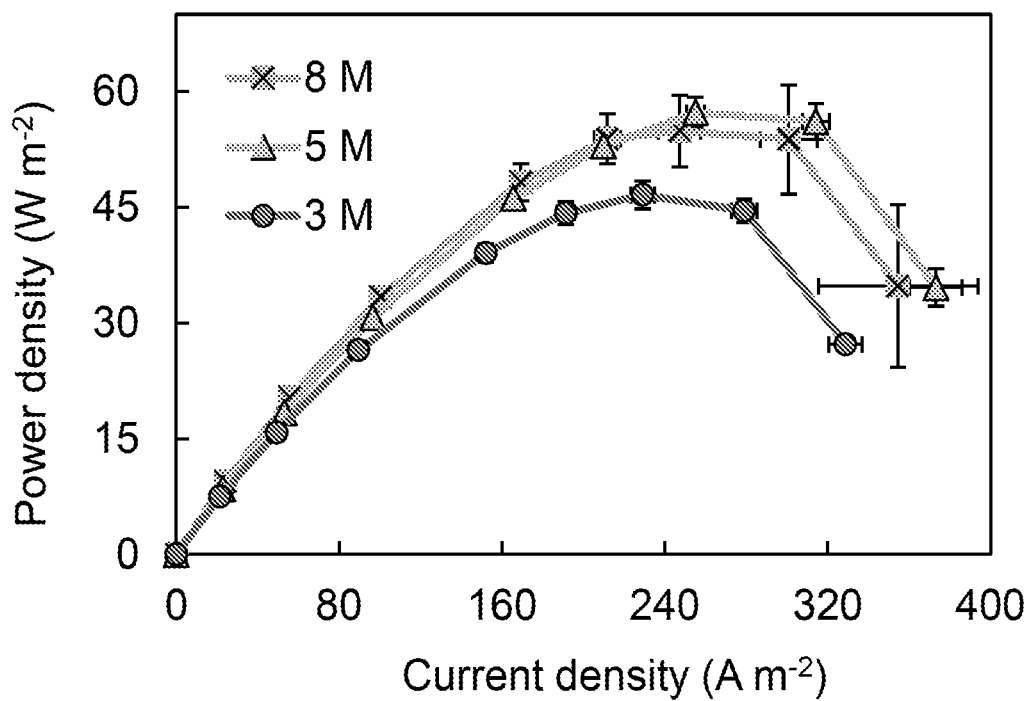
FIG. 3A is a graph showing power production with different concentrations of $NH_4NO_3$ as the supporting electrolyte, with 0.1 M Cu(II) in both electrolyte and 1 M ammonia in the anolyte; error bars represent standard deviations based on measurements with duplicate reactors.
Figure 3B:
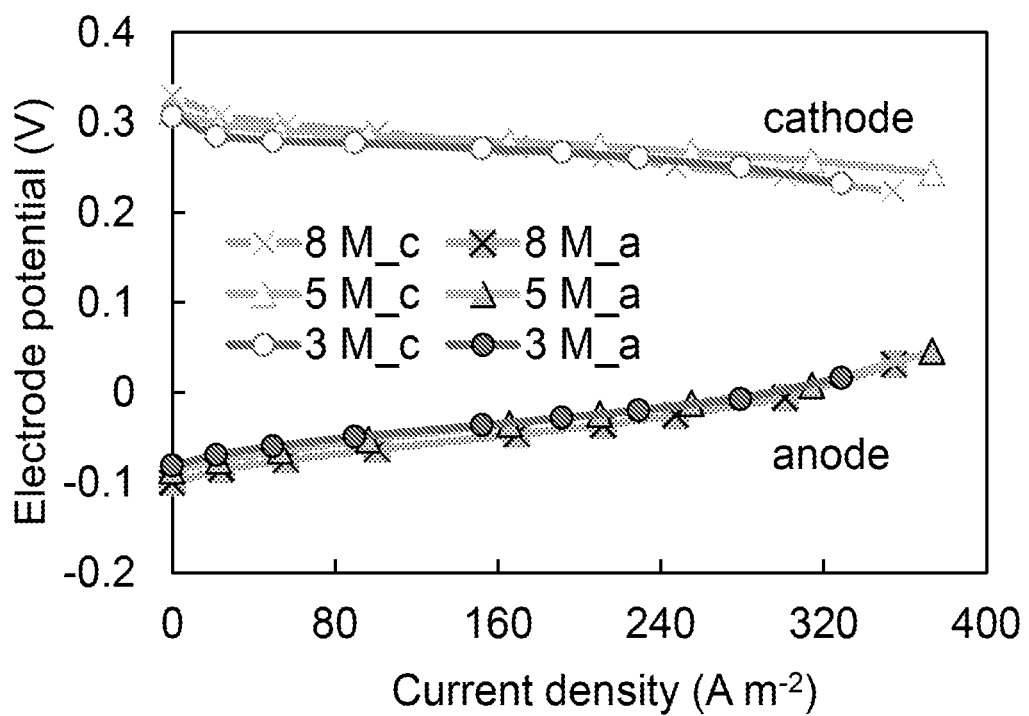
FIG. 3B is a graph showing electrode potentials with different concentrations of $NH_4NO_3$ as the supporting electrolyte, with 0.1 M Cu(II) in both electrolyte and 1 M ammonia in the anolyte; error bars represent standard deviations based on measurements with duplicate reactors; concentrations shown include "a" to indicate anode and "c" to indicate cathode.

The effect of the supporting electrolyte concentration was examined with 0.1 M Cu(II) and 1 M anolyte ammonia, by varying the NH$_4$NO$_3$ concentrations. Increasing the concentration of NH$_4$NO$_3$ generally increased the power production, with maximum power densities of 47±2 W m$^{-2}$ (3 M), 57±2 W m$^{-2}$ (5 M) and 55±5 W m$^{-2}$ (8 M) as shown in FIG. 3A. However, power production in the 8 M tests was more erratic, as seen by the higher standard deviations, than results at other concentrations. In addition, the power production at 8 M was similar to that obtained at 5 M. Increasing the concentration from 3 M to 8 M did not appreciably affect electrode potentials as shown in FIG. 3B, indicating that the reduction in solution resistance was the main reason for improved power production when increasing the NH$_4$NO$_3$ concentrations from 3 to 8 M. However, anode performance was greatly improved compared to operation of the TRAB without NH$_4$NO$_3$ addition as shown in FIG. 7. The use of concentrated NH$_4^+$ inhibited ammonia dissociation and improved ammonia activities, leading to more negative anode potentials. Both anode and cathode overpotentials greatly decreased with addition of NH$_4$NO$_3$ as the supporting electrolyte, due to the increase in solution conductivities as shown in FIG. 7. As reference electrodes were inserted outside the main current path, the measurement of electrode potentials included negligible ohmic potential drop, providing true electrode potentials.

Stirring of the catholyte was needed to achieve high power densities with 3-8 M NH$_4$NO$_3$ solutions, as shown by the evolution of power overshoot in the power curves (where the power curve bends back to lower current densities in the high current region), FIGS. 3 and 7. Without stirring, power overshoot was observed using 3, 5 and 8 M NH$_4$NO$_3$, as a result of sharp decrease in cathode potentials at high current densities, likely as a result of cathode concentration polarization. This phenomenon did not occur in the absence, or addition of 1 M NH$_4$NO$_3$, due to the lower current densities produced in these conditions as shown in FIG. 7.

Figure 4:
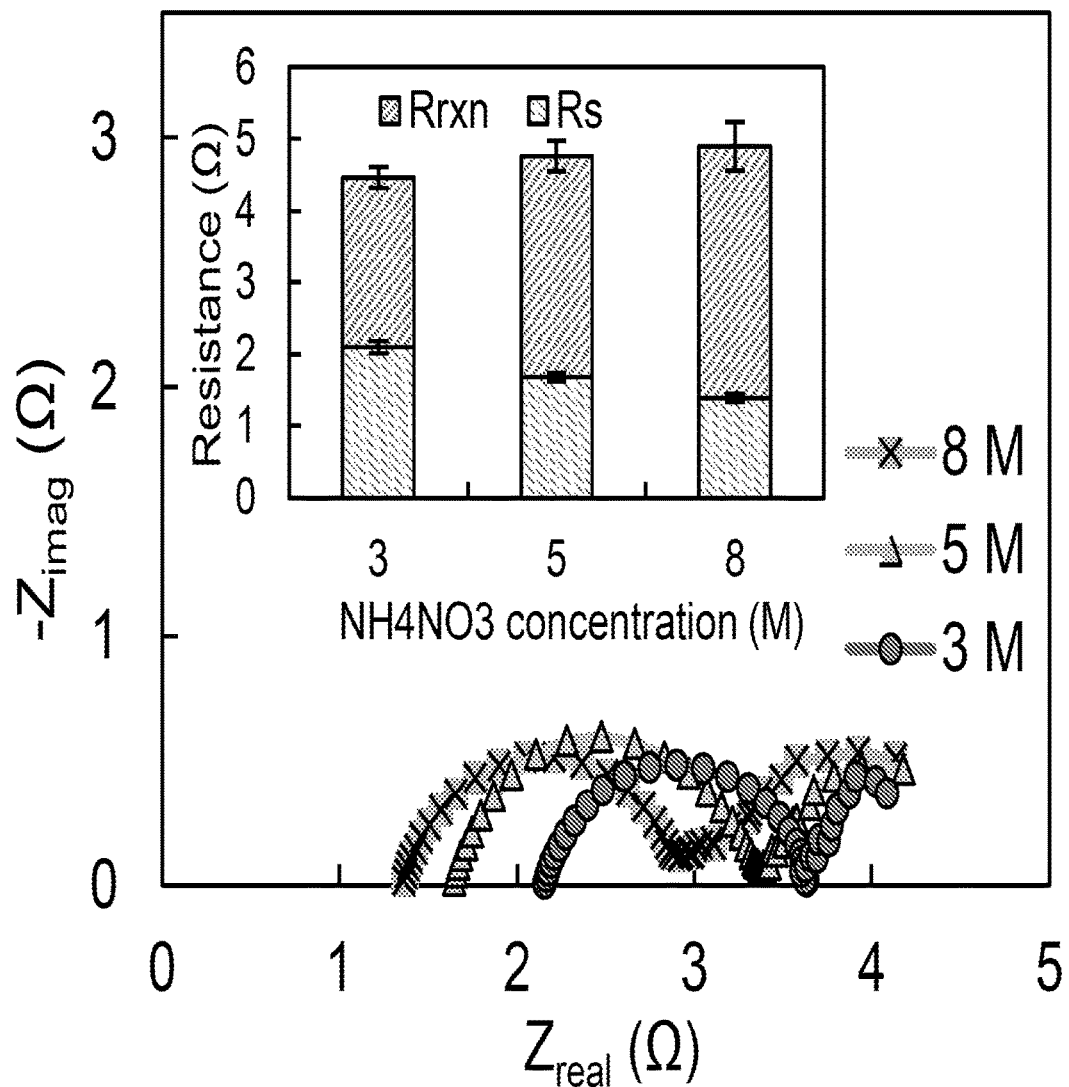
FIG. 4 shows Nyquist plots of the whole cell impedance at 0.2 V with 3-8 M $NH_4NO_3$, all with 0.1 M Cu(II) and 1 M ammonia anolyte; the insert shows the components of the impedance obtained by fitting the Nyquist spectra to the equivalent circuit described in FIG. 10.

Electrochemical impedance spectroscopy (EIS) was used under a whole cell condition of 0.2 V to identify the components of cell impedance at different NH$_4$NO$_3$ concentrations. With increasing NH$_4$NO$_3$ concentrations, cell ohmic resistance decreased from 2.1±0.1Ω (3 M) to 1.4±0.1Ω (8 M), as a result of increased solution conductivity as shown in FIG. 4. However, this decrease in ohmic resistance was offset by an increase in the reaction resistance from 2.4±0.1Ω (3 M) to 3.5±0.3Ω (8 M) as shown in FIG. 4. This increase in reaction resistance that offset the benefit of reduced ohmic resistance was consistent with power production results showing that maximum power densities were not further improved when increasing the NH$_4$NO$_3$ concentration from 5 M to 8 M.

Cell Scalability

To prove that multiple cells could be used to increase overall voltage and power production, two cells were connected in series and examined in polarization tests.

Figure 5A:
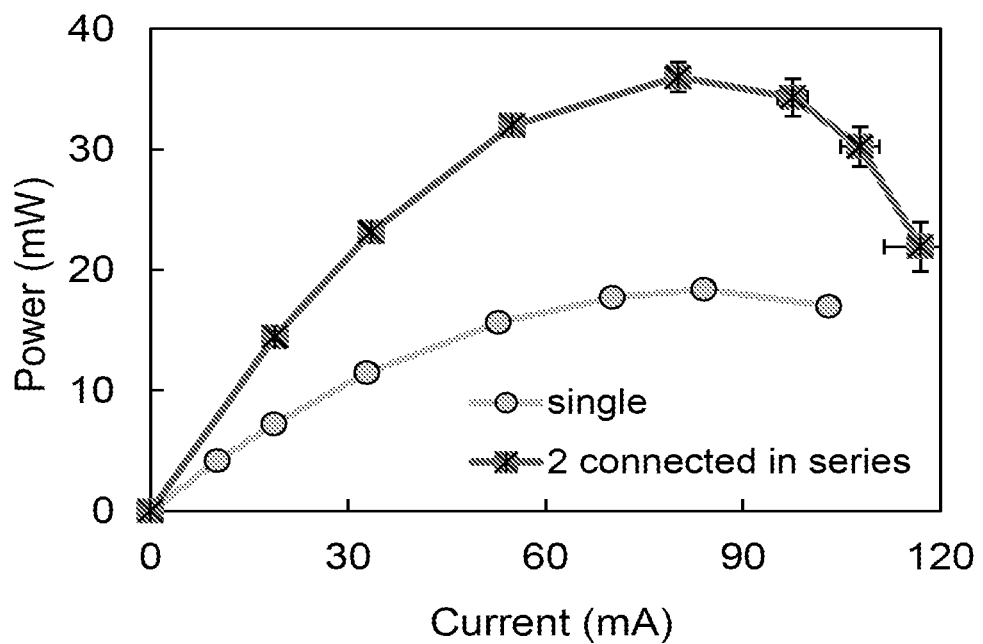
FIG. 5A is a graph showing power production of two cells that were connected in series, in comparison with the single cell operation; electrolyte contained 0.1 M Cu(II) with 2 M ammonia in the anolyte, and 5 M $NH_4NO_3$ as supporting electrolyte; error bars represent standard deviations based on measurements with duplicate reactors; open symbols show cathode potentials, and filled symbols show anode potentials.
Figure 5B:
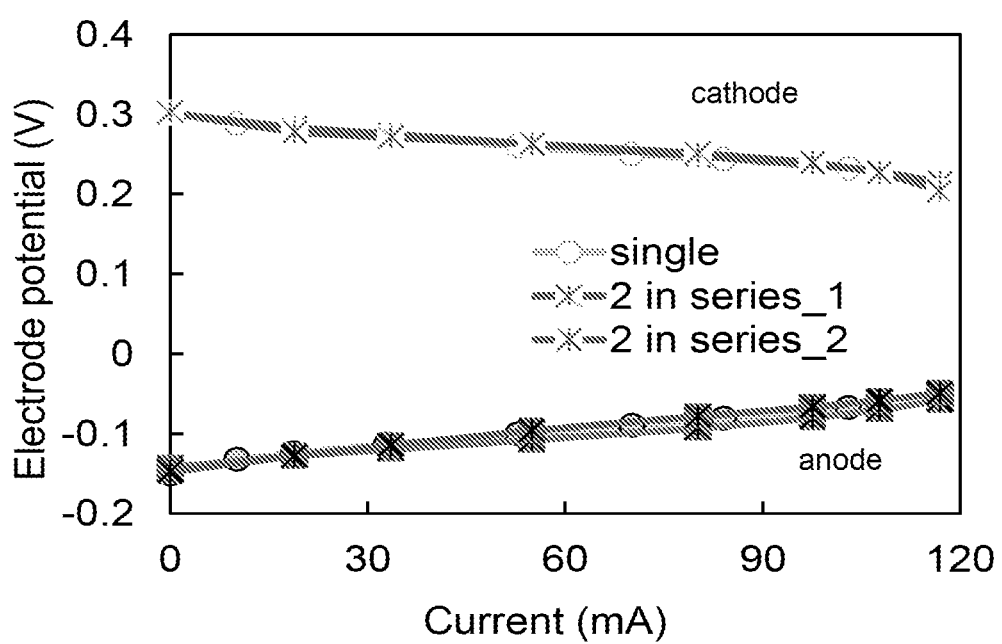
FIG. 5B is a graph showing electrode potentials of two cells that were connected in series, in comparison with the single cell operation; electrolyte contained 0.1 M Cu(II) with 2 M ammonia in the anolyte, and 5 M $NH_4NO_3$ as supporting electrolyte; error bars represent standard deviations based on measurements with duplicate reactors.

With two cells, the maximum power production reached 36.0±1.2 mW, which was double that obtained by a single cell (18.4±0.1 mW; 5 M NH$_4$NO$_3$, 0.1 M Cu(NO$_3$)$_2$ electrolytes, and 2 M NH$_3$ in the anolyte) as shown in FIG. 5A. The electrode performance with the two-cell configuration was similar to that obtained by an individual cell, see FIG. 5B, showing that it was possible to connect multiple reactors in series to boost voltage and power production.

Cycling Performance and Efficiencies

Figure 8A:
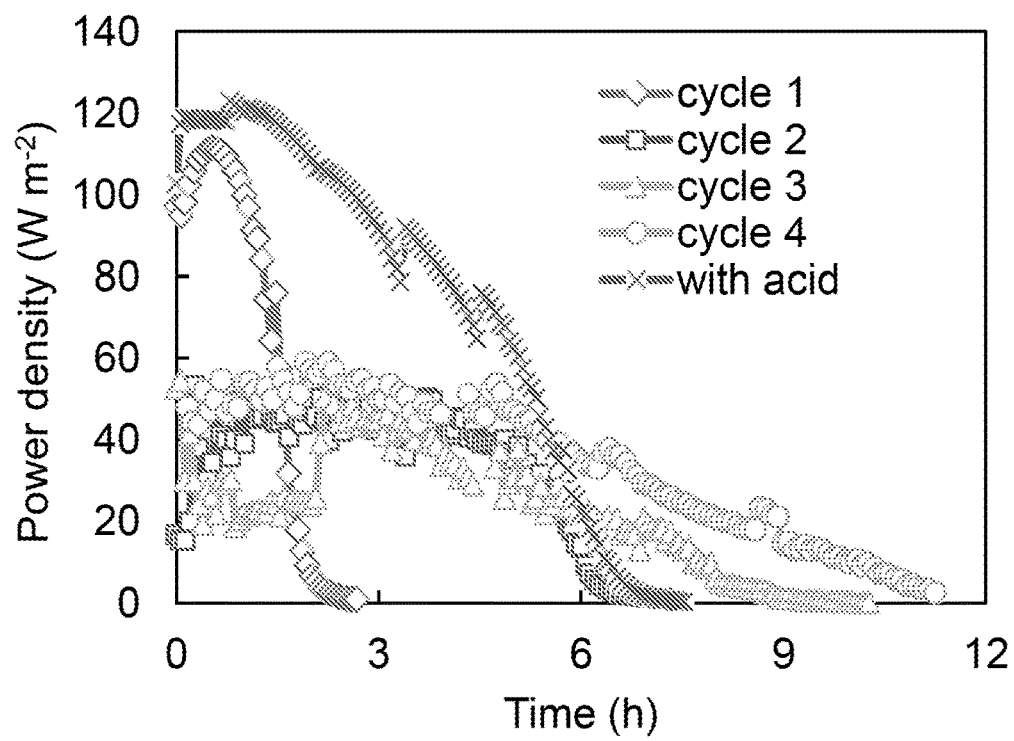
FIG. 8A is a graph showing whole batch cycle performance power density of four successive cycles; the initial electrolyte contained 0.1 M Cu(II), 5 M NH$_4$NO$_3$ and additional 2 M NH$_3$ in the anolyte; the electrolyte was then thermally regenerated and operated for 3 successive cycles; "with acid" stands for the condition where acid was added to dissolve the Cu(OH)$_2$ precipitates during the catholyte regeneration.
Figure 8B:
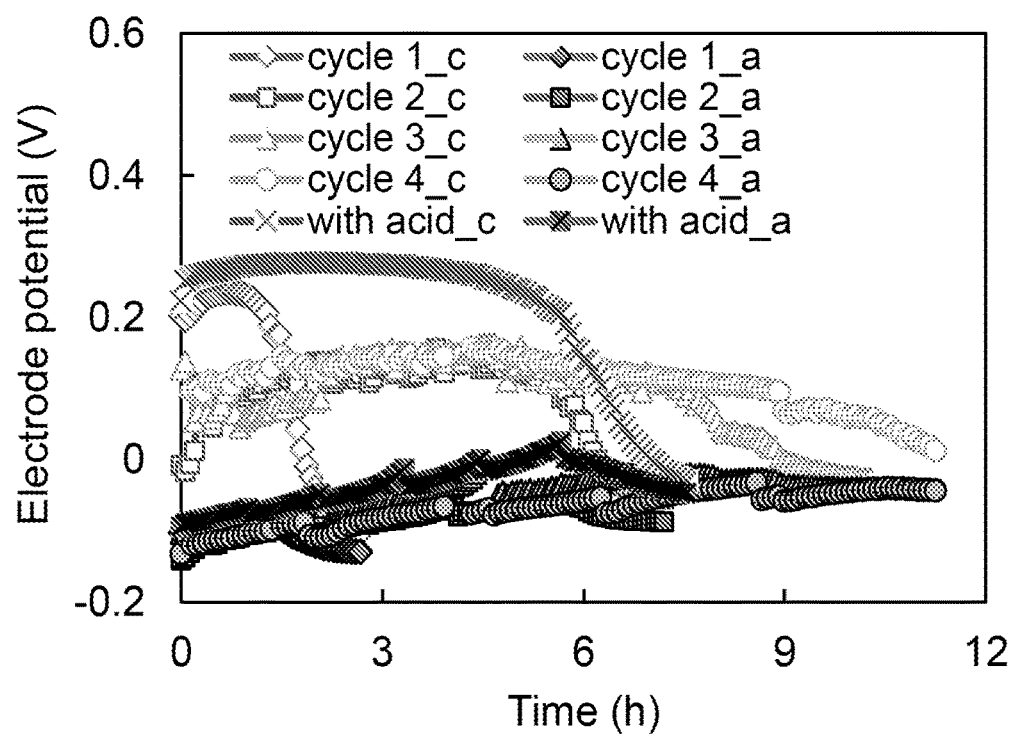
FIG. 8B is a graph showing whole batch cycle performance electrode potentials of four successive cycles; the initial electrolyte contained 0.1 M Cu(II), 5 M NH$_4$NO$_3$ and additional 2 M NH$_3$ in the anolyte; the electrolyte was then thermally regenerated and operated for 3 successive cycles; "with acid" stands for the condition where acid was added to dissolve the Cu(OH)$_2$ precipitates during the catholyte regeneration.

Efficient transformation of waste heat into electrical power depends on consistent cell performance over multiple cycles. Therefore, power production by the TRAB was examined following electrolyte regeneration over three successive cycles [0.1 M Cu(II), 5 M NH$_4$NO$_3$ in both electrolytes and 2 M NH$_3$ in the anolyte]. Cells were operated at the load that produced the maximum power under these conditions (2.6Ω external resistance), with the cycle terminated when the voltage was <20 mV. In the first cycle, with fresh electrolytes, the end of the cycle was due primarily to a sharp decrease in the cathode potential as a result of soluble Cu$^{2+}$ depletion (91±3% reduction) in the catholyte as shown in FIG. 8. The cathode coulombic efficiency was 102±5%, suggesting that Cu$^{2+}$ reduction to Cu was the predominant reaction at the cathode. The anode coulombic efficiency was only 37±4%, indicating that excess copper leached into the solution, likely due to dissolved oxygen being present as an alternate electron acceptor. The energy density in this initial cycle was 453±28 Wh m$^{-3}$ (normalized to the total electrolyte volume, or 61±4 J cm$^{-2}$ normalized to the projected surface area of a single electrode). The energy recovery was 44±3% (based on the energy in the starting solution), but this recovery is a function of the external resistance (electrical load), and therefore it likely could be increased by using a larger external resistance.

Figure 6:
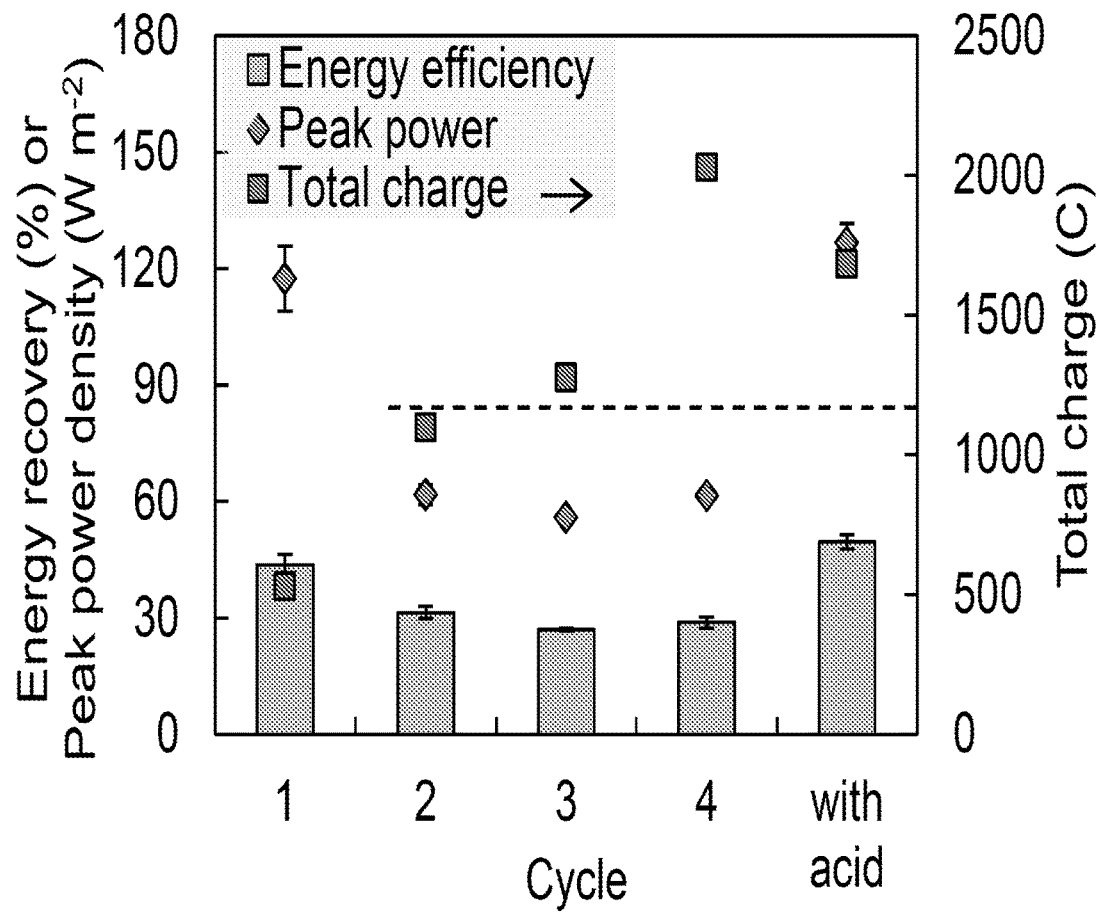
FIG. 6 is a graph showing performance of a TRAB over successive cycles. Initial electrolyte contained 0.1 M Cu(II), 5 M $NH_4NO_3$ and additional 2 M $NH_3$ in the anolyte; the spent electrolyte was then regenerated and operated for 3 successive cycles; "with acid" stands for the condition where acid was added to the regenerated catholyte to fully dissolve $Cu(OH)_2$ that was formed during the regeneration; the dashed line indicates the theoretical limit of total charge based on the initial Cu(II) concentration, see FIG. 8 for complete cycle profiles.

For the second and successive cycles, ammonia was removed by heating the anolyte effluent (simulating distillation), and concentrated ammonia was added into the new anolyte. Stripping ammonia out of the anolyte effluent decreased the solution pH from ~9 to ~4.6. This resulted in formation of a precipitate in the electrolyte during this process due to the side reaction Cu(NH$_3$)$_4^{2+}$+4 H$_2$O→Cu (OH)$_2$ (s)+2 NH$_3$.H$_2$O+2 NH$_{4+}$. In the three successive regeneration cycles, this precipitate resulted in a similar but reduced performance, with peak power densities averaging 60±3 W m$^{-2}$ (61.7±2.5 W m$^{-2}$, cycle 2; 55.9±0.7 W m$^{-2}$, cycle 3; and 61.4±0.8 W m$^{-2}$, cycle 4) as shown in FIG. 6. The lower power densities with the regenerated electrolyte were due to more negative cathode potentials produced by the Cu(OH)$_2$ precipitates, see FIG. 8B. The energy recoveries remained high, averaging 29±2% (31±2%, cycle 2; 27±0.4%, cycle 3; and 29±1%, cycle 4) as shown in FIG. 6, versus the starting energy stored in the solution. Peak power densities and energy recoveries were relatively stable during the three regeneration cycles, showing good reproducibility with successive cycles. Acid was added into the regenerated catholyte to decrease the pH and dissolve the Cu(OH)$_2$. This increased the cell performance to 126±5 W m$^{-2}$, and the energy recovery to 49±2%, FIG. 6. This effect of pH indicates that availability of a waste acid stream, or an inexpensive source of acid, might be used to achieve and maintain a higher cell performance than that possible using only a distillation process to regenerate the ammonia.

The total charge transferred in the second cycle (1100±26 C) was double that of the first cycle (529±16 C), due to the accumulated Cu(II) from the first cycle. An AEM was used to minimize mixing of Cu(II) species between the electrode chambers, thus the regenerated catholyte was more concentrated in Cu(II) due to copper corrosion in the previous cycle, and the regenerated anolyte had relatively depleted Cu(II). The charge increased with successive cycles, eventually exceeding the theoretical maximum (1156 C) based on the initial copper amount in the solution from the third cycle as shown in FIG. 6. This increase in charge over successive cycles was consistent with the low anodic coulombic efficiencies, indicating that excess metal copper non-electrochemically oxidized and dissolved into the solution. This excess copper corrosion by oxygen might also have affected the regeneration of the solution, as this reaction [Cu (s)+1/2 $O_2$+4 $NH_3H_2O \rightarrow Cu(NH_3)_4^{2+}$+2 $OH^-$+3 $H_2O$] increased the solution pH, resulting in formation of $Cu(OH)_2$ during electrolyte regeneration. Optionally, this precipitation is mitigated by removal of dissolved oxygen from the solution, and by reducing oxygen leakage into the cell. The excess Cu(II) leaching into the solution is optionally recovered by other electrochemical technologies, such as cathodic reduction in microbial fuel cells, or electrodeposition.

Power Production at Various Temperatures

Figure 11A:
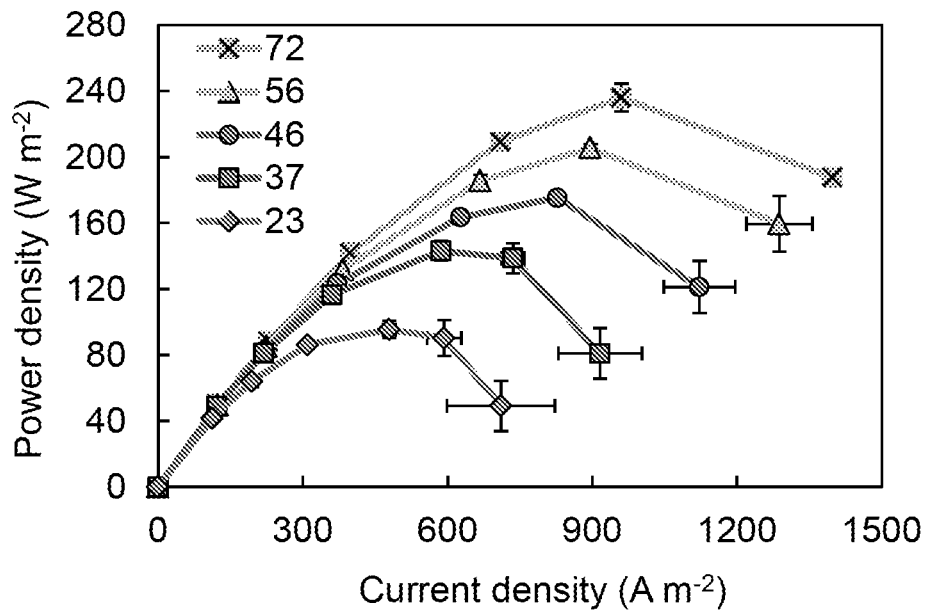
FIG. 11A is a graph showing power density of a TRAB operated at various temperatures.
Figure 11B:
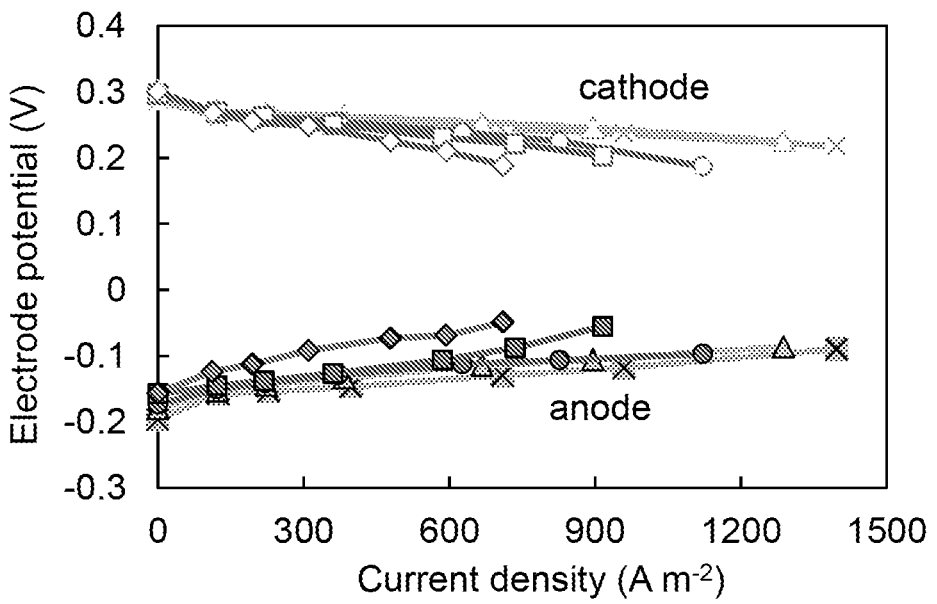
FIG. 11B is a graph showing electrode potentials of a TRAB operated at various temperatures; line symbols in FIG. 7B indicate solution conditions as shown in 7A, with open symbols used for the cathode potentials and filled symbols for the anode potentials.
Figure 12:
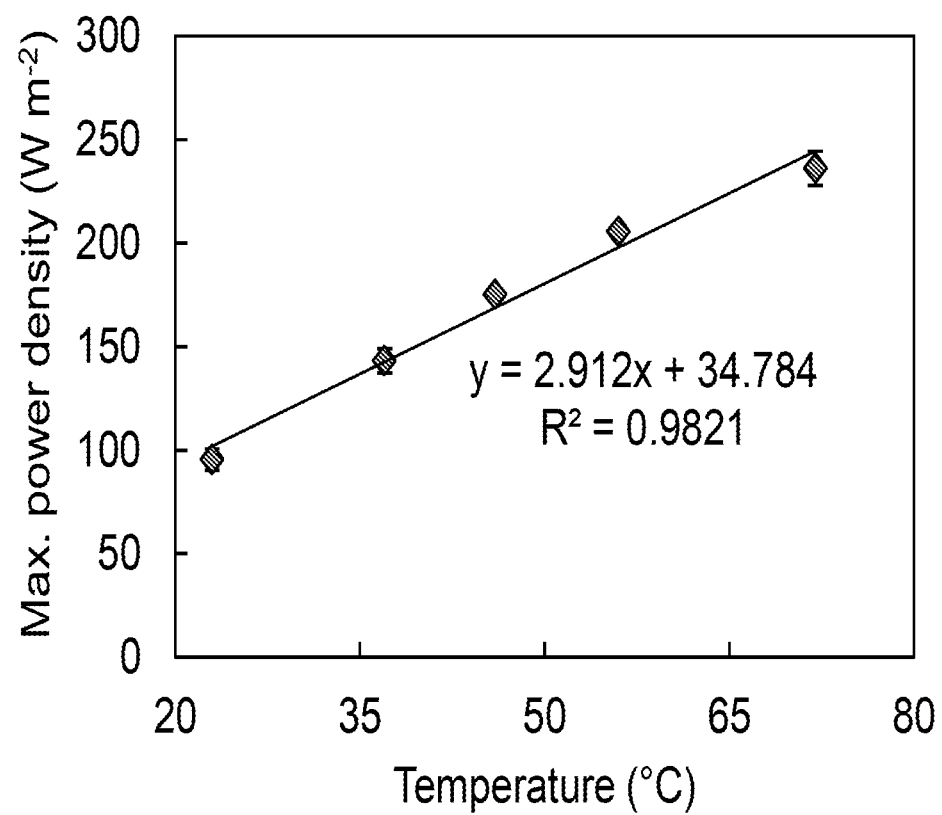
FIG. 12 is a graph showing that maximum power production showed a positive relationship with the temperature.

At the room temperature of 23° C., the TRAB obtained a maximum power density of 95±5 W m-2. Increasing the operating temperature greatly enhanced the power production, from 143±6 W m-2 at 37° C. to 236±8 W m-2 at 72° C. (FIG. 11A). The maximum power density and temperature showed a positive correlation with a linear $R^2$ of 0.98 (FIG. 12). This enhancement in power production was attributed to a better performance of both the anode and the cathode at elevated temperatures (FIG. 11B). Although the increasing temperature did not favor the cathode thermodynamics showing slightly more negative cathode open circuit cathode potentials, it resulted in an enhancement for the anode thermodynamics with more negative anode open circuit potentials. The higher temperature led to reduced overpotentials for both electrodes (FIG. 11B), indicating better reaction kinetics at higher temperature.

Charge Production and Coulombic Efficiency at Elevated Temperatures

Figure 13A:
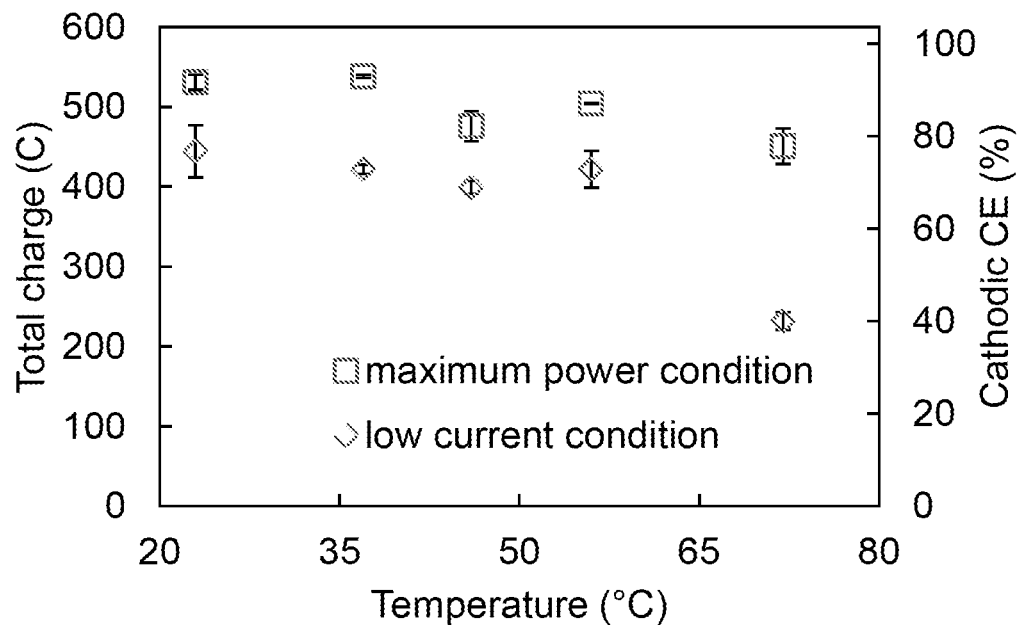
FIG. 13A is a graph showing total charge and corresponding cathodic coulombic efficiency.

At the maximum power condition, total produced charge slightly decreased with increasing temperature, with the highest of 540±2 C obtained at 37° C. and the lowest of 450±20 C obtained at 72° C. The charge generally decreased with increasing temperature, due to the self-discharge as a result of anolyte ammonia crossover to the catholyte chamber, which non-electrochemically reacted with $Cu^{2+}$ to form the $Cu(NH_3)_4^{2+}$. At the low current condition, varying the temperature from 23° C. to 56° C. did not appreciably change the total produced charge that ranged from 440-400 C, while increasing the temperature to 72° C. greatly decreased the charge production to 230±10 C (FIG. 13A). The TRAB that was discharged at the low current condition had lower total charge produced in one cycle, compared to that operated at maximum power production condition (high current) at the same temperature, due to the longer cycle duration with the low current condition that resulted in a larger ammonia flux into the catholyte. This lower produced charge translated to a lower coulombic efficiency based on cathodic $Cu^{2+}$ reduction. When the TRAB was operated at the maximum power condition, the coulombic efficiencies ranged 78-93% depending on the temperature, while at low current condition the coulombic efficiency was lower to 40-77% (FIG. 13A).

Figure 13B:
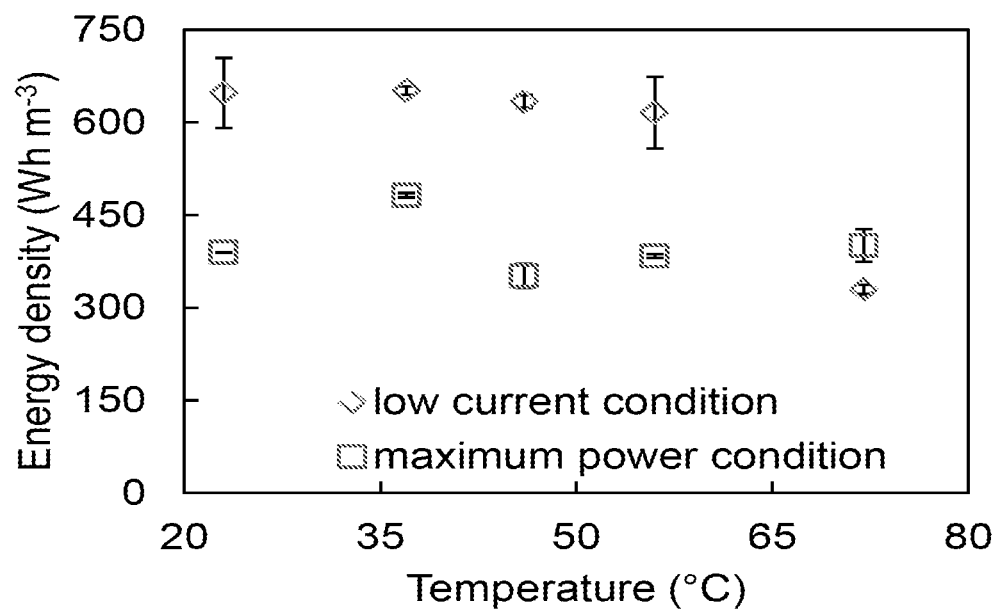
FIG. 13B is a graph showing energy density for TRABs that were discharged at the maximum power condition and the low current condition.

Although maximum power production increased almost linearly with the increasing temperature, the energy density showed a more complex trend as a result of the tradeoff between the power production and cycle time that was affected by ammonia crossover. At the maximum power production condition, the energy density was 390±0.1 Wh m-3 at 23° C. It was increased to 480±3 Wh m-3 at 37° C., as power production increased without appreciable impact on cycle time. However, further increase in temperature did not result in a further increase in energy density, as the sharp decreased cycle time offset the higher peak power production. In the range of 46-72° C. that had similar cycle time, energy density slightly increased from 350±20 (46° C.) to 400±26 Wh m-3 (72° C.) due to the higher power densities (FIG. 13B). Although the TRAB operated at the low current condition produced lower charge, they obtained higher energy densities, due to higher discharge voltage at the low current condition (W=QE). At the low current condition (a larger external resistance), similar energy density of 620-650 Wh m-3 was observed for the temperature range of 23-56° C., and dramatically decreased to 330±7 Wh m-3 when the temperature was increased to 72° C. (FIG. 13B).

The energy densities (highest of 650 Wh m-3) obtained here were comparable with that obtained with PRO using a modified thin-film nano-composite and concentrated seawater brine (860 Wh m-3), and much higher than that obtained with the ammonium bicarbonate RED system (118 Wh m-3). While the typical flow batteries for energy storage obtain a much higher energy density of 10-50 kWh/m3, the electrolyte concentration of typical vanadium flow battery is much higher that approaches the vanadium salt solubility limit (1.7-2.5 M). In our current system, the catholyte Cu' concentration was only 0.1 M, which was far below the solubility limit of $Cu(NO_3)^2$ (59.2 wt % at 25° C., ~3.5 M), indicating that the energy density of the TRAB could be greatly improved by increasing the electrolyte concentrations. Based on $Cu(NO_3)^2$ solubility of 3.5 M, the theoretical maximum energy density of the TRAB is 42 kWh m-3.

Figure 14A:
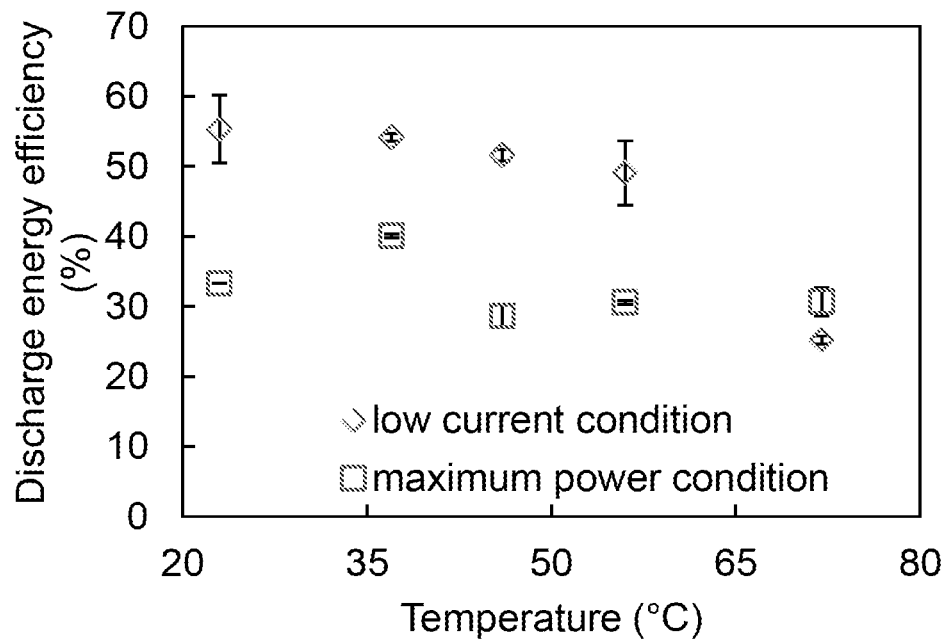
FIG. 14A is a graph showing discharge energy efficiency (discharge energy versus the stored chemical energy in the TRAB) at the low current condition and the maximum power condition.

Discharge Energy Efficiency and Thermal Energy Efficiency at Elevated Temperatures In the TRAB, thermal energy is converted to electrical power by two sequential steps, that it is first converted into the chemical energy and stored in the electrolyte of the TRAB during the charge process, and then converted to electrical energy during the discharge process. Discharge energy efficiency reflected the extraction efficiency of the chemical energy stored in the TRAB, while the thermal energy efficiency is the overall thermal-electrical energy conversion efficiency. Similar to the trend of energy densities, the discharge energy efficiency increased from 33% at 23° C. to 40% at 37° C., while further increasing the temperature led to a decreased efficiency of ~30% due to the ammonia crossover. At low current condition, the discharge energy efficiency increased to 50-55%, except for the condition at 72° C. where the efficiency was only 25% (FIG. 14A).

Figure 14B:
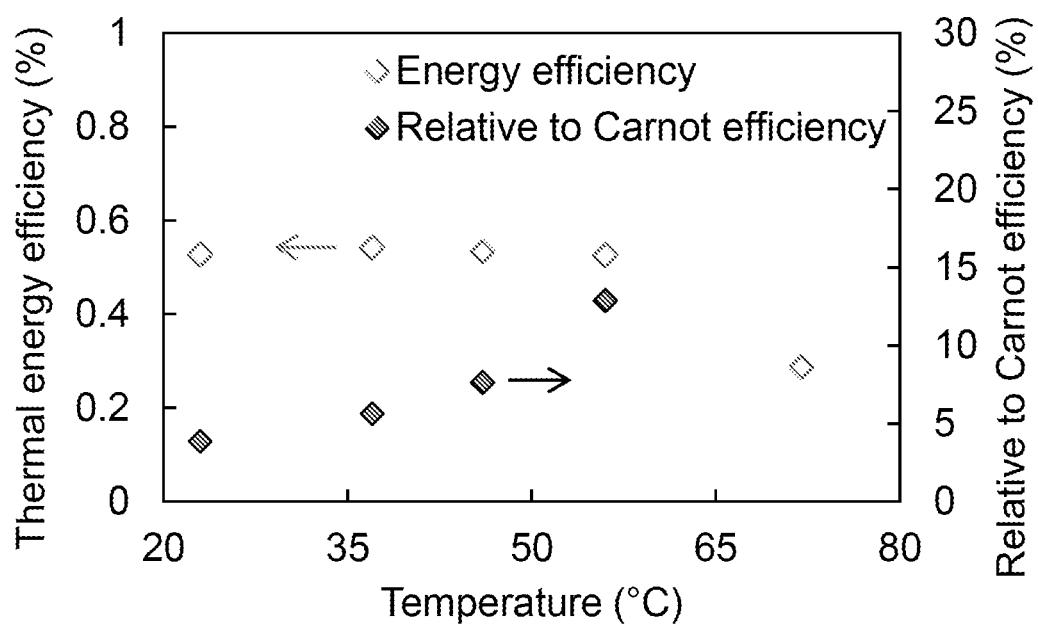
FIG. 14B is a graph showing thermal energy efficiency (discharge energy versus the required thermal energy for regeneration) and that relative to Carnot efficiency based on the discharge at the low current condition.

Thermal energy efficiency was estimated relative to the thermal energy required for the electrolyte regeneration. By increasing the effluent temperature from 23 to 72° C., the heat duty of the distillation column did not change appreciably, ranging from 245 (23° C.) to 230 (72° C.) kWh/m3-anolyte, although the energy cost for raising the solution temperature dropped from 60 to ~0 kWh/m3-anolyte. As discharging at the low current condition generally produced higher energy densities, we only analyze the thermal energy efficiency for this condition. The overall thermal energy efficiency was similar of ~0.53% (23-56° C.), and dropped to 0.29% at 72° C. (FIG. 14B). The Carnot efficiency was estimated with respect to the column reboiler temperature of 70.4° C., decreasing from 13.8% to 4.2% as the temperature difference was smaller with the increasing operation temperature. Thus the efficiency relative to the Carnot efficiency increased from 3.8 to 12.5% when the anolyte temperature increased from 23 to 56° C. (FIG. 14B).

The electrolyte regeneration cycle described herein is optionally coupled into an ammonia-water absorption refrigeration cycle to further exact the energy from the waste heat.

Example 2

Figure 15A:
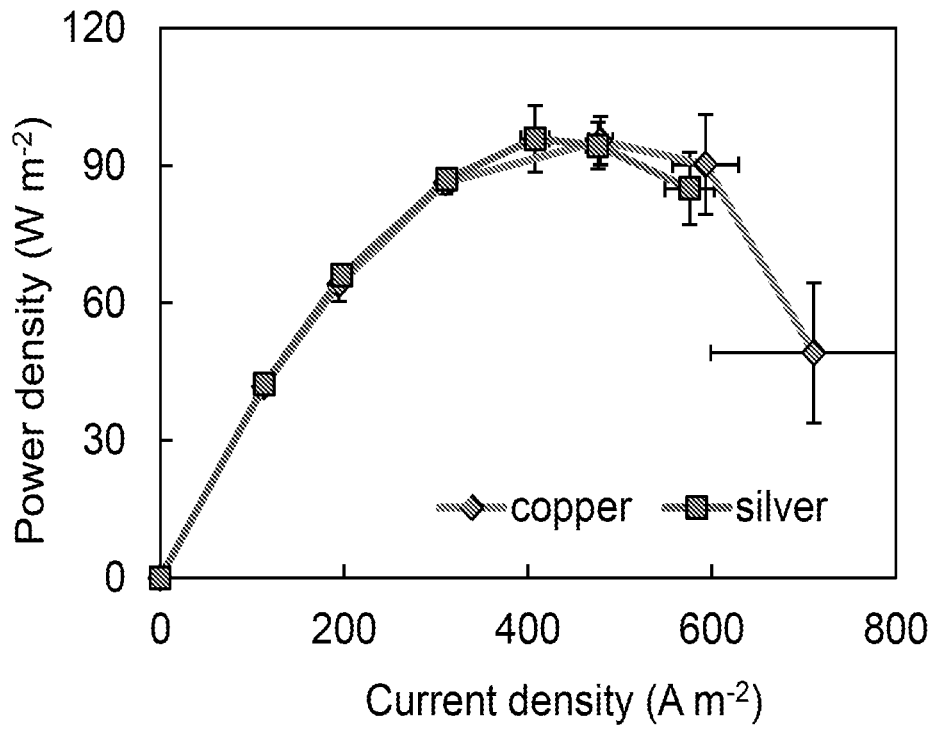
FIG. 15A is a graph showing power densities of a TRAB using copper or silver electrodes and corresponding metal salt as electrolytes.
Figure 15B:
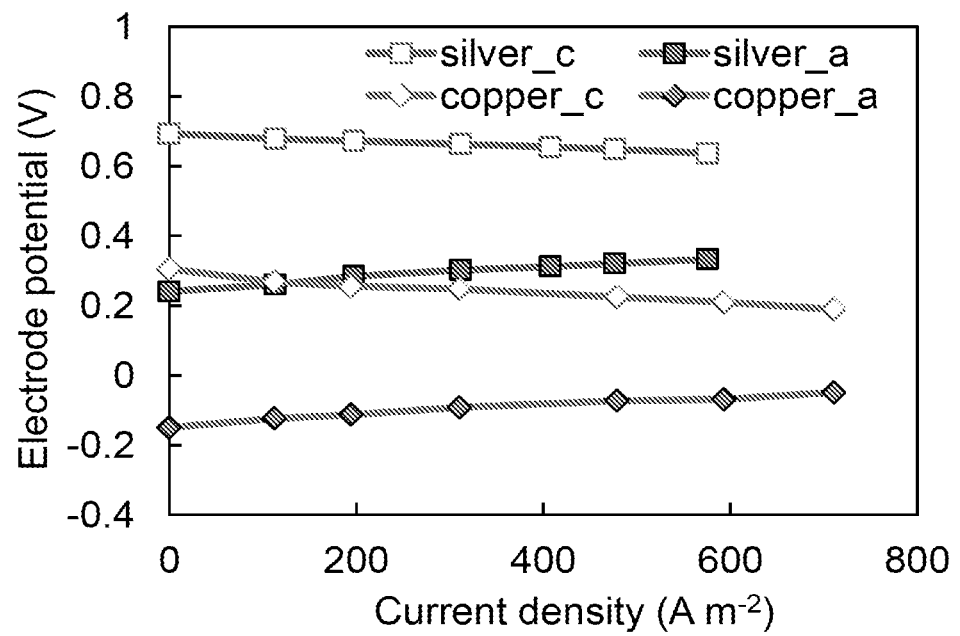
FIG. 15B is a graph showing electrode potentials of a TRAB using copper or silver electrodes and corresponding metal salt as electrolytes; concentrations shown include "a" to indicate anode and "c" to indicate cathode.

Using silver electrodes and silver nitrate electrolyte in the TRAB system produced a maximum power density of 96±7 W m-2 at room temperature, similar to that of 95±5 W m-2 with the copper system (FIG. 15A). With the silver system, both electrode potentials were more positive than those obtained with the copper system, due to the higher reduction potentials of Ag+/Ag (E0 of 0.799 V), and Ag$(NH_3)_2^+$/Ag (E0 of 0.373 V).

Example 3

Figure 16A:
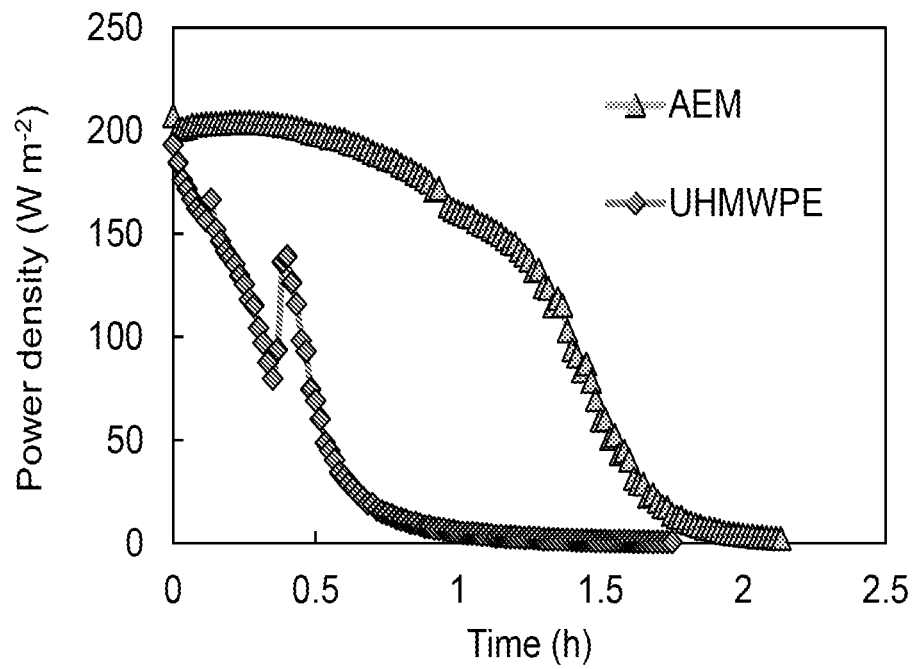
FIG. 16A is a graph showing power densities of a TRAB (copper) over a fed-batch cycle with anion exchange membrane (AEM) or battery separator.
Figure 16B:
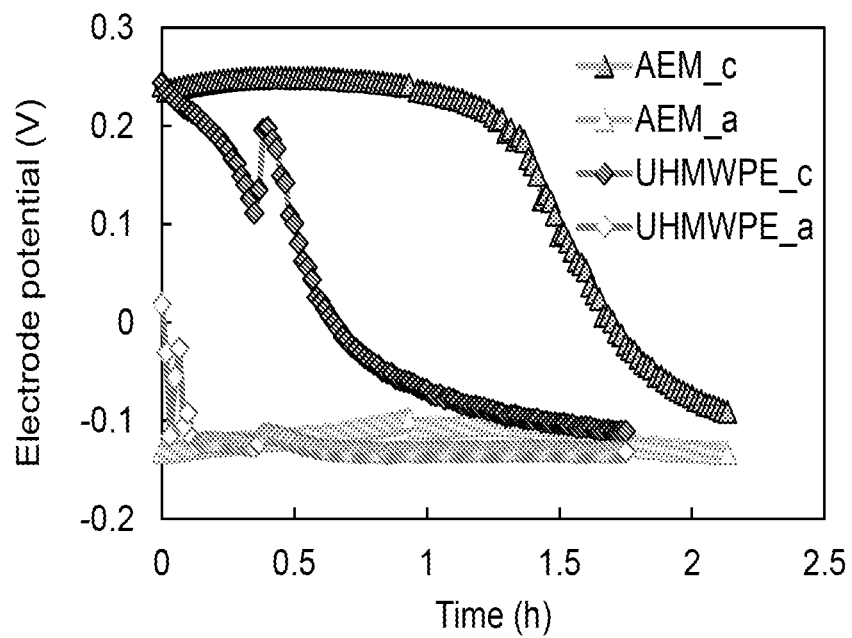
FIG. 16B is a graph showing electrode potentials of a TRAB (copper) over a fed-batch cycle with AEM or battery separator.

The inexpensive ultra-high-molecular-weight polyethylene (UHMWPE) battery separator can be used as an alternative separator material for the TRAB. At the temperature of 50° C., the UHMWPE produced similar peak power densities with that of the AEM (~190 W m-2), but the power density dropped faster due to the faster ammonia crossover (FIG. 16A). The energy density with the UHMWPE was 215±7 Wh m-3, about 35% of that obtained with the AEM (622±129 Wh m-3) (FIG. 16B).

TRAFB Construction and Operation

A TRAFB with one cell pair was constructed by using two copper plates (50 mm×50 mm×0.5 mm) separated by anion exchange membrane (Selemion AMV, 50 mm×50 mm) (FIG. 17A). Spacers with a thickness of 1.5 mm were used to form the flow channels (4 cm×2 cm) for anolyte and catholyte (FIG. 17B). The endplates were polycarbonate plates to fix the stack with screwed rods and nuts.

A TRAFB with four cell pairs connected in parallel was constructed with three more pairs of copper plates (FIG. 18). The adjacent copper anode and cathode were separated by insulated silicone gasket.

A TRAFB with four cell pairs connected in series was constructed with three more copper plates (FIG. 19). The copper plates in the middle function as both anode and cathode.

Anolyte with different $NH_3$, $Cu(NO_3)_2$, and $NH_4NO_3$ concentrations and catholyte with corresponding $Cu(NO_3)_2$ and $NH_4NO_3$ concentrations were continuously pumped through their channels at certain flow rates. Supporting electrolyte $NH_4NO_3$ was added to decrease solution resistance. All solutions were sparged with pure nitrogen to eliminate the impact of oxygen that can act as an alternate electron acceptor of copper corrosion.

Measurements and Calculations

Polarization tests were performed using a potentiostat (model 1470E, Solatron Analytical, Hampshire, England). Current (I, A) was scanned from open circuit (0 A) to short circuit (maximum current) at a rate of 1 mA/s. Cell voltage (U, V) was recorded. Then, power (P, W) can be obtained according to P=UI. Power density (P, W m$^{-2}$) of TRAFB with one cell pair was calculated by normalizing power by the working surface area of the anode, cathode, or membrane (8×10$^{-4}$ m$^2$).

Energy density was obtained by recycling 20 mL anolyte [3 M $NH_3$, 0.2 M $Cu(NO_3)_2$, and 3 M $NH_4NO_3$] and 20 mL catholyte [0.2 M $Cu(NO_3)_2$ and 3 M $NH_4NO_3$] at a flow rate of 4 mL/min until current decreased less than 0.01 A with a fixed 2Ω external resistance. Then, energy density (E, Wh m$^{-3}$) was calculated by E=∫UIt/V, where U is the voltage (V), I is the current (A), t is the cycle time (h), and V is the volume of anolyte (2×10$^{-5}$ m$^3$).

Discharging energy efficiency ($\eta_{discharging}$) was calculated as the ratio between actual energy density and the theoretical energy density. The theoretical energy density was determined based the ΔG (ΔG=nFE, in which E was the measured open-circuit voltage of ~0.44 V) of the overall cell reaction: $Cu^{2+}$+4$NH_3$ (aq)→$Cu(NH_3)_4^{2+}$ (aq) with 0.2 M Cu(II) in the catholyte and 3 M ammonia in the anolyte, which was −85 kJ mol$^{-1}$ (i.e., 4709 Wh M$^{-3}$ normalized to the anolyte volume). Thermal energy efficiency ($\eta_{thermal}$) was calculated as the ratio between the actual energy density and the required thermal energy for anolyte regeneration estimated in the HYSYS software. The thermal energy needed for ammonia separation from the anolyte (3 M) was estimated to be 268 kWh m$^{-3}$-anolyte using the same simulation conditions as for 2 M ammonia described in Zhang, F. et al. *Energy Environ. Sci.* 2015, 8, 343-349; and Zhang, F. et al., *Chemsuschem* 2015, 8, 1043-1048. After optimizing the simulation conditions for 3 M ammonia, the thermal energy for anolyte regeneration was reduced to approximately 192 kWh m$^{-3}$-anolyte.

Coulombic efficiency of the anode ($\eta_a$) and cathode ($\eta_c$) was calculated as the ratio between actual produced charge and theoretical amount of charge based on the mass change of the electrode. The electrode mass was measured using an analytical balance.

Stability Test

The stability of TRAFB with four cell pairs connected in parallel was examined by alternatively exchanging the flow pathways of anolyte [2 M $NH_3$, 0.1 M $Cu(NO_3)_2$, and 5 M $NH_4NO_3$] and catholyte [0.1 M $Cu(NO_3)_2$ and 5 M $NH_4NO_3$] every 30 min at a flow rate of 1 mL/min. The cell voltage (U, V) with a fixed 3Ω external resistance (R=3Ω) was recorded, and power (P, W) was calculated based on voltage and resistance (P=U$^2$/R).

Performance with Different Concentrations

The power production of TRAFB with one cell pair was investigated with different supporting electrolyte (1 M, 3 M, and 5 M $NH_4NO_3$), copper concentration [0.1 M, 0.2 M, and 0.3 M $Cu(NO_3)_2$], and ammonia concentration (2 M, 3 M, and 4 M $NH_3$) at a flow rate of 1 mL/min. When the supporting electrolyte increased from 1 M to 3 M, the maximum power density increased from 20 W m$^{-2}$ to 26 W m$^{-2}$. Further increase to 5 M made no obvious improvement to power generation, which indicated that solution resistance was not a limitation anymore with higher supporting electrolyte concentration than 3 M. Increase of copper concentration has positive effects on copper deposition at the cathode ($Cu^{2+}$+2e$^-$→Cu), but has negative impacts on copper corrosion at the anode. Thus, the maximum power density was greatly improved to 31 W m$^{-2}$ when the copper concentration changed from 0.1 M to 0.2 M $Cu(NO_3)_2$ due to enhanced copper deposition at the cathode, but no apparent change was observed when it further increased to 0.3 M. Increase of ammonia concentration in the anolyte would enhance copper corrosion at the anode [Cu+4$NH_3$→$Cu(NH_3)_4^{2+}$+2e$^-$], but conversely formation of more copper ammine complex would inhibited copper corrosion. When $NH_3$ concentration increased from 2 M to 3 M, the maximum power density increased from 31 W m$^{-2}$ to 36 W m$^{-2}$. Further increase to 4 M resulted in a decrease of maximum power density to 34 W m$^{-2}$. According to above results, the optimum concentrations of TRAFB was considered to be 3 M $NH_4NO_3$, 0.2 M $Cu(NO_3)_2$, and 3 M $NH_3$.

The different optimum solution concentrations for TRAFB and TRAB should be due to the different reactor configurations. For TRAFB, much smaller electrode distance (3 mm) was obtained compared to that in the TRAB reactors (2 cm). Therefore, lower supporting electrolyte concentration can be used in TRAFB. Because the surface volume ratio (6 cm$^2$/cm$^3$) in TRAFB was much larger than that (0.05 cm$^2$/cm$^3$) in TRAB, the optimum reactant concentrations for copper and ammonia were higher.

Performance at Different Flow Rates

The maximum power density of TRAFB with one cell pair was further improved with flow rates increasing from 1 mL/min to 4 mL/min due to enhanced mass transfer, and then stabilized at 45 W m$^{-2}$. The maximum power density of 45 W m$^{-2}$ based on anode, cathode, or membrane area was a little lower than that of 57 W m$^{-2}$ based on anode or cathode working area in TRAB batch reactors, but much higher than that of 25 W m$^{-2}$ based on membrane area in the TRAB. The difference between TRAFB and TRAB results from the varied ratios between anion exchange membrane and electrode working area. This ratio in TRAFB was 1, much smaller than that (4.37) in TRAB, which implied that excessive membrane was used in TRAB. As a result, a little higher power density based on electrode working area was obtained in TRAB, but the power density based on membrane was much lower.

Energy Density and Thermal Efficiency

The energy density of TRAFB was about 1260 Wh m$^{-3}$-anolyte, much higher than that of 906 Wh m$^{-3}$-anolyte in TRAB batch reactors. This could be due to the higher optimum concentrations for copper (3 M) and ammonia (3 M), and reduced ammonia crossover from anolyte to catholyte attributed to smaller ratio between membrane area and electrode working area. As a result, the thermal energy efficiency of 4.7% was also much higher than that of 0.86% in TRAB batch reactors. After optimizing the distillation process for 3 M ammonia, the thermal energy required for anolyte regeneration was reduced to 192 kWh m$^{-3}$-anolyte and the thermal energy efficiency further increased to 6.5%.

The discharging energy efficiency was 27% similar to TRAB, which indicated that increased chemical energy stored in the solutions in TRAFB was converted to electrical power with the same efficiency in TRAB. The coulombic efficiencies of electrodes were also similar to TRAB. The coulombic efficiency of the anode was 35% based on the total charge and mass change of the anode, and the coulombic efficiency of the cathode was almost 100% in terms of total charge compared to mass change of the cathode.

Scalability and Stability

In order to investigate the scalability of TRAFB by increase cell pairs, the power generation of TRAFB with different cell pairs (from 1 to 4) connected in parallel was examined. The current and power were boosted by increasing cell pairs. The maximum current increased from 90 mA (1 cell pair) to 290 A (4 cell pairs). The maximum power linearly increased with the number of cell pairs from 17 mW (1 cell pair) to 62 mW (4 cell pairs), with a slope of 16 mW per cell pair. To boost the voltage and power, power generation of TRAFB with 4 cell pairs connected in series was also tested. Much higher open circuit voltage of 1.63 V was obtained with similar maximum power production compared to that with 4 cell pairs connected in parallel. These results demonstrated that TRAFB can be easily scaled up by increasing cell pairs. The power generation almost linearly increased with the number of cell pairs. High current could be obtained with cell pairs connected in parallel, while high voltage could be achieved with cell pairs connected in series.

The stability of TRAFB system was examined by alternatively exchanging the flow paths of the anolyte and catholyte. The cell voltage with a 3Ω external resistance was recorded and power was calculated based on voltage and resistance. When the anolyte and catholyte were exchange, the cell voltage became reverse, but the values were similar around 0.3 V. The power generation was also very stable around 30 mW. A little higher power was obtained in cycle 1 and 7 probably because DI water was used to wash TRAFB system before these two cycles.

Items

1. A method of use of an ammonia-based thermoelectrochemical system, comprising:

providing an ammonia-based thermoelectrochemical system, the system comprising a first electrode compartment and a second electrode compartment, a separator interposed between the first electrode compartment and the second electrode compartment, the reactor comprising first and second electrodes disposed in the first and second electrode compartments, respectively, both the first and the second electrode comprising at least one metal M selected from copper, silver, cobalt and nickel, the metal M in the first and the second electrode in solid form, wherein the first and second electrode both comprise the same metal M, a conductive conduit for electrons in electrical communication with the first electrode and the second electrode, the first and second electrode compartments containing an electrolyte comprising a solution of an ammonium salt and a salt of the at least one metal M, wherein the salt of the at least one metal M is a salt of the same metal M present in the first and second electrodes;

adding ammonia to the first electrode compartment, thereby promoting reactions in the first and second electrode compartments:

first electrode compartment: M (s)+x NH$_3$ (aq)→M(NH$_3$)$_x^{y+}$+ye−, second electrode compartment: M$^{y+}$ (aq)+ye−→M (s)

where y is one or two, wherein the reaction in the first electrode compartment produces a first spent electrolyte and the reaction in the second electrolyte compartment produces a second spent electrolyte, the reactions producing an electrical current.

2. The method of item 1, further comprising heating the first spent electrolyte to volatilize and remove ammonia, thereby regenerating the electrolyte and regenerating the electrode in the first electrode compartment; and adding ammonia to the second spent electrolyte, thereby promoting reactions in the first electrode and second electrode compartments:

first electrode compartment: M (s)+x NH$_3$ (aq)→M(NH$_3$)$_x^{y+}$+ye−, second electrode compartment: M$^{y+}$ (aq)+ye−→M (s)

where y is one or two, wherein the reaction in the first electrode compartment produces a first spent electrolyte and the reaction in the second electrolyte compartment produces a second spent electrolyte, the reactions producing an electrical current.

3. The method of item 1 or 2, further comprising repeating the steps of item 2 one or more additional times.

4. The method of any of items 1-3, wherein the metal M is copper and the electrolyte comprises an aqueous solution of ammonium nitrate (NH$_4$NO$_3$) and copper nitrate (Cu(NO$_3$)$_2$).

5. The method any of items 1-3, wherein the metal M is silver and the electrolyte comprises an aqueous solution of ammonium nitrate (NH$_4$NO$_3$) and silver nitrate (AgNO$_3$).

6. The method any of items 1-3, wherein the metal M is nickel and the electrolyte comprises an aqueous solution of ammonium nitrate (NH$_4$NO$_3$) and nickel nitrate (Ni(NO$_3$)$_2$).

7. The method any of items 1-6, wherein the first and/or second electrode is a flow electrode.

8. The method any of items 1-7, wherein the first electrode compartment is in flow communication with a first electrolyte reservoir.

9. The method any of items 1-8, wherein the second electrode compartment is in flow communication with a second electrolyte reservoir.

10. The method of any of items 1-9, further comprising sparging the electrolyte with a non-oxygen containing gas to remove oxygen and inhibit corrosion of electrodes in the reactor.

11. An ammonia-based thermoelectrochemical system, comprising:
a reactor comprising a first electrode compartment and a second electrode compartment, a separator interposed between the first electrode compartment and the second electrode compartment, the reactor comprising first and second electrodes disposed in the first and second electrode compartments, respectively, both the first and the second electrode comprising at least one metal M selected from copper, silver, cobalt and nickel, the metal M in the first and the second electrode in solid form, wherein the first and second electrode both comprise the same metal M, a conductive conduit for electrons in electrical communication with the first electrode and the second electrode, the first and second electrode compartments containing an electrolyte comprising a solution of an ammonium salt and a salt of the at least one metal M, wherein the salt of the at least one metal M is a salt of the same metal M present in the first and second electrodes.

12. The system of item 11 wherein the first and second electrodes comprise copper.

13. The system of item 11 wherein the first and second electrodes comprise silver.

14. The system of item 11 wherein the first and second electrodes comprise cobalt.

15. The system of item 11 wherein the first and second electrodes comprise nickel.

16. The system of item 11 wherein the first and second electrodes consist essentially of copper.

17. The system of item 11 wherein the first and second electrodes consist essentially of silver.

18. The system of item 11 wherein the first and second electrodes consist essentially of cobalt.

19. The system of item 11 wherein the first and second electrodes consist essentially of nickel.

20. The system of item 11 wherein the first and/or second electrodes comprise particles of granular activated carbon coated with copper.

21. The system of item 11 wherein the first and/or second electrodes comprise particles of granular activated carbon coated with silver.

22. The system of item 11 wherein the first and/or second electrodes comprise particles of granular activated carbon coated with cobalt.

23. The system of item 11 wherein the first and/or second electrodes comprise particles of granular activated carbon coated with nickel.

24. The system of item 11, wherein the reactor further comprises one or more seals to inhibit entry of oxygen into the reactor.

25. A method of use of an ammonia-based thermoelectrochemical system, comprising:
providing an ammonia-based thermoelectrochemical system, the system comprising at least two cells, each cell comprising a first electrode compartment and a second electrode compartment; a separator interposed between the first electrode compartment and the second electrode compartment, wherein the first electrode compartment of each of the at least two cells is in flow communication with each other first electrode compartment and a first electrolyte reservoir and wherein the second electrode compartment of each of the at least two cells is in flow communication with each other second electrode compartment and a second electrolyte reservoir; the reactor comprising first and second electrodes disposed in the first and second electrode compartments, respectively, of each of the at least two cells, both the first and the second electrode of each of the at least two cells comprising at least one metal M selected from copper, silver, cobalt and nickel, the metal M in the first and the second electrode of each of the at least two cells in solid form, wherein the first and second electrode of each of the at least two cells both comprise the same metal M, a conductive conduit for electrons in electrical communication with the first electrode and the second electrode of each of the at least two cells, the first and second electrode compartments of each of the at least two cells containing an electrolyte comprising a solution of an ammonium salt and a salt of the at least one metal M, wherein the salt of the at least one metal M is a salt of the same metal M present in the first and second electrodes of each of the at least two cells;

adding ammonia to the first electrode compartments of each of the at least two cells, thereby promoting reactions in the first and second electrode compartments of each of the at least two cells;

first electrode compartments: $M\ (s) + x\ NH_3\ (aq) \rightarrow M(NH_3)_x^{y+} + ye-$, second electrode compartments: $M^{y+}\ (aq) + ye- \rightarrow M\ (s)$ where y is one or two, wherein the reaction in the first electrode compartments of each of the at least two cells produces a first spent electrolyte and the reaction in the second electrolyte compartments of each of the at least two cells produces a second spent electrolyte, the reactions producing an electrical current.

26. The method of item 25, further comprising heating the first spent electrolyte to volatilize and remove ammonia, thereby regenerating the electrolyte and regenerating the electrode in the first electrode compartments of each of the at least two cells; and adding ammonia to the second spent electrolyte, thereby promoting reactions in the first and second electrode compartments of each of the at least two cells:

first electrode compartment: $M\ (s) + x\ NH_3\ (aq) \rightarrow M(NH_3)_x^{y+} + ye-$, second electrode compartment: $M^{y+}\ (aq) + ye- \rightarrow M\ (s)$ where y is one or two, wherein the reaction in the first electrode compartments of each of the at least two cells produces a first spent electrolyte and the reaction in the second electrolyte compartments of each of the at least two cells produces a second spent electrolyte, the reactions producing an electrical current.

27. The method of item 25 or 26, further comprising repeating the steps of item 26 one or more additional times.

28. The method of any of items 25-27, wherein the metal M is copper and the electrolyte comprises an aqueous solution of ammonium nitrate ($NH_4NO_3$) and copper nitrate ($Cu(NO_3)_2$) or the metal M is silver and the electrolyte comprises an aqueous solution of ammonium nitrate ($NH_4NO_3$) and silver nitrate ($AgNO_3$) or the metal M is nickel and the electrolyte comprises an aqueous solution of ammonium nitrate ($NH_4NO_3$) and nickel nitrate ($Ni(NO_3)_2$).

29. The method of any of items 25-28, wherein the first and/or second electrode of each of the at least two cells is a flow electrode.

30. The method of any of items 25-29, further comprising sparging the electrolyte with a non-oxygen containing gas to remove oxygen and inhibit corrosion of electrodes in the reactor.

31. An ammonia-based thermoelectrochemical system, comprising:

a reactor comprising at least two cells, each cell comprising a first electrode compartment and a second electrode compartment; a separator interposed between the first electrode compartment and the second electrode compartment of each of the at least two cells, wherein the first electrode compartment of each of the at least two cells is in flow communication with each other first electrode compartment and a first electrolyte reservoir and wherein the second electrode compartment of each of the at least two cells is in flow communication with each other second electrode compartment and a second electrolyte reservoir; the reactor comprising first and second electrodes disposed in the first and second electrode compartments, respectively, of each of the at least two cells both the first and the second electrode of each of the at least two cells comprising at least one metal M selected from copper, silver, cobalt and nickel, the metal M in the first and the second electrode of each of the at least two cells in solid form, wherein the first and second electrode of each of the at least two cells both comprise the same metal M, a conductive conduit for electrons in electrical communication with the first electrode and the second electrode of each of the at least two cells, the first and second electrode compartments of each of the at least two cells containing an electrolyte comprising a solution of an ammonium salt and a salt of the at least one metal M, wherein the salt of the at least one metal M is a salt of the same metal M present in the first and second electrodes of each of the at least two cells.

32. The system of item 31 wherein the first and second electrodes in each of the at least two cells comprise copper, silver, cobalt or nickel.

33. The system of item 31 wherein the first and second electrodes in each of the at least two cells consist essentially of copper, silver, cobalt or nickel.

34. The system of item 31 wherein the first and/or second electrodes in each of the at least two cells comprise particles of granular activated carbon coated with copper, silver, cobalt or nickel.

35. The system of item 31, wherein the reactor further comprises one or more seals to inhibit entry of oxygen into the reactor.

36. A method of use of an ammonia-based thermoelectrochemical system, comprising:

providing an ammonia-based thermoelectrochemical system, the system comprising a first electrode compartment and a second electrode compartment, a separator interposed between the first electrode compartment and the second electrode compartment, the reactor comprising first and second electrodes disposed in the first and second electrode compartments, respectively, both the first and the second electrode comprising at least one metal M selected from copper, silver, cobalt and nickel, the metal M in the first and the second electrode in solid form, wherein the first and second electrode both comprise the same metal M, a conductive conduit for electrons in electrical communication with the first electrode and the second electrode, the first and second electrode compartments containing an electrolyte comprising a solution of an ammonium salt and a salt of the at least one metal M, wherein the salt of the at least one metal M is a salt of the same metal M present in the first and second electrodes;

adding ammonia to the first electrode compartment, thereby promoting reactions in the first and second electrode compartments:

first electrode compartment: M (s)+x $NH_3$ (aq)→ $M(NH_3)_x^{y+}$+ye−, second electrode compartment: $M^{y+}$ (aq)+ye−→M (s)

where y is one or two, wherein the reaction in the first electrode compartment produces a first spent electrolyte and the reaction in the second electrolyte compartment produces a second spent electrolyte, the reactions producing an electrical current.

37. The method of item 36, further comprising heating the first spent electrolyte to volatilize and remove ammonia, thereby regenerating the electrolyte and regenerating the electrode in the first electrode compartment; and adding ammonia to the second spent electrolyte, thereby promoting reactions in the first electrode and second electrode compartments:

first electrode compartment: M (s)+x $NH_3$ (aq)→ $M(NH_3)_x^{y+}$+ye−, second electrode compartment: $M^{y+}$ (aq)+ye−→M (s)

where y is one or two, wherein the reaction in the first electrode compartment produces a first spent electrolyte and the reaction in the second electrolyte compartment produces a second spent electrolyte, the reactions producing an electrical current.

38. The method of item 36 or 37, further comprising repeating the steps of item 37 one or more additional times.

39. The method any of items 36-38, wherein the first and/or second electrode is a flow electrode.

40. The method any of items 36-39, wherein the first electrode compartment is in flow communication with a first electrolyte reservoir.

41. The method any of items 36-40, wherein the second electrode compartment is in flow communication with a second electrolyte reservoir.

42. The method of any of items 36-41, further comprising sparging the electrolyte with a non-oxygen containing gas to remove oxygen and inhibit corrosion of electrodes in the reactor.

43. An ammonia-based thermoelectrochemical system, comprising:

a reactor comprising a first electrode compartment and a second electrode compartment, a separator interposed between the first electrode compartment and the second electrode compartment, the reactor comprising first and second electrodes disposed in the first and second electrode compartments, respectively, both the first and the second electrode comprising at least one metal M selected from copper, silver, cobalt and nickel, the metal M in the first and the second electrode in solid form, wherein the first and second electrode both comprise the same metal M, a conductive conduit for electrons in electrical communication with the first electrode and the second electrode, the first and second electrode compartments containing an electrolyte comprising a solution of an ammonium salt and a salt of the at least one metal M, wherein the salt of the at least one metal M is a salt of the same metal M present in the first and second electrodes.

44. The system of item 43, wherein the reactor further comprises one or more seals to inhibit entry of oxygen into the reactor.

45. A method of use of an ammonia-based thermoelectrochemical system, comprising:

providing an ammonia-based thermoelectrochemical system, the system comprising at least two cells, each cell comprising a first electrode compartment and a second electrode compartment; a separator interposed between the first electrode compartment and the second electrode compartment, wherein the first electrode compartment of each of the at least two cells is in flow communication with each other first electrode compartment and a first electrolyte reservoir and wherein the second electrode compartment of each of the at least two cells is in flow communication with each other second electrode compartment and a second electrolyte reservoir; the reactor comprising first and second electrodes disposed in the first and second electrode compartments, respectively, of each of the at least two cells, both the first and the second electrode of each of the at least two cells comprising at least one metal M selected from copper, silver, cobalt and nickel, the metal M in the first and the second electrode of each of the at least two cells in solid form, wherein the first and second electrode of each of the at least two cells both comprise the same metal M, a conductive conduit for electrons in electrical communication with the first electrode and the second electrode of each of the at least two cells, the first and second electrode compartments of each of the at least two cells containing an electrolyte comprising a solution of an ammonium salt and a salt of the at least one metal M, wherein the salt of the at least one metal M is a salt of the same metal M present in the first and second electrodes of each of the at least two cells;

adding ammonia to the first electrode compartments of each of the at least two cells, thereby promoting reactions in the first and second electrode compartments of each of the at least two cells;

first electrode compartments: $M\ (s) + x\ NH_3\ (aq) \rightarrow M(NH_3)_x^{y+} + ye-$, second electrode compartments: $M^{y+}\ (aq) + ye- \rightarrow M\ (s)$ where y is one or two, wherein the reaction in the first electrode compartments of each of the at least two cells produces a first spent electrolyte and the reaction in the second electrolyte compartments of each of the at least two cells produces a second spent electrolyte, the reactions producing an electrical current.

46. The method of item 45, further comprising heating the first spent electrolyte to volatilize and remove ammonia, thereby regenerating the electrolyte and regenerating the electrode in the first electrode compartments of each of the at least two cells; and adding ammonia to the second spent electrolyte, thereby promoting reactions in the first and second electrode compartments of each of the at least two cells:

first electrode compartment: $M\ (s) + x\ NH_3\ (aq) \rightarrow M(NH_3)_x^{y+} + ye-$, second electrode compartment: $M^{y+}\ (aq) + ye- \rightarrow M\ (s)$ where y is one or two, wherein the reaction in the first electrode compartments of each of the at least two cells produces a first spent electrolyte and the reaction in the second electrolyte compartments of each of the at least two cells produces a second spent electrolyte, the reactions producing an electrical current.

47. The method of item 45 or 46, further comprising repeating the steps of item 46 one or more additional times.

48. The method of any of items 45-47, wherein the first and/or second electrode of each of the at least two cells is a flow electrode.

49. The method of any of items 45-48, further comprising sparging the electrolyte with a non-oxygen containing gas to remove oxygen and inhibit corrosion of electrodes in the reactor.

50. An ammonia-based thermoelectrochemical system, comprising:

a reactor comprising at least two cells, each cell comprising a first electrode compartment and a second electrode compartment; a separator interposed between the first electrode compartment and the second electrode compartment of each of the at least two cells, wherein the first electrode compartment of each of the at least two cells is in flow communication with each other first electrode compartment and a first electrolyte reservoir and wherein the second electrode compartment of each of the at least two cells is in flow communication with each other second electrode compartment and a second electrolyte reservoir; the reactor comprising first and second electrodes disposed in the first and second electrode compartments, respectively, of each of the at least two cells both the first and the second electrode of each of the at least two cells comprising at least one metal M selected from copper, silver, cobalt and nickel, the metal M in the first and the second electrode of each of the at least two cells in solid form, wherein the first and second electrode of each of the at least two cells both comprise the same metal M, a conductive conduit for electrons in electrical communication with the first electrode and the second electrode of each of the at least two cells, the first and second electrode compartments of each of the at least two cells containing an electrolyte comprising a solution of an ammonium salt and a salt of the at least one metal M, wherein the salt of the at least one metal M is a salt of the same metal M present in the first and second electrodes of each of the at least two cells.

51. The system of item 50, wherein the reactor further comprises one or more seals to inhibit entry of oxygen into the reactor.

52. The method or system of any of items 36-51, wherein the metal M is copper and the electrolyte comprises an aqueous solution of ammonium nitrate ($NH_4NO_3$) and copper nitrate ($Cu(NO_3)_2$).

53. The method or system of any of items 36-51, wherein the metal M is silver and the electrolyte comprises an aqueous solution of ammonium nitrate ($NH_4NO_3$) and silver nitrate ($AgNO_3$).

54. The method or system of any of items 36-51, wherein the metal M is nickel and the electrolyte comprises an aqueous solution of ammonium nitrate ($NH_4NO_3$) and nickel nitrate ($Ni(NO_3)_2$).

55. The method or system of any of items 36-51, wherein the first and second electrodes comprise copper.

56. The method or system of any of items 36-51, wherein the first and second electrodes comprise silver.

57. The method or system of any of items 36-51, wherein the first and second electrodes comprise cobalt.

58. The method or system of any of items 36-51, wherein the first and second electrodes comprise nickel.

59. The method or system of any of items 36-51, wherein the first and second electrodes consist essentially of copper.

60. The method or system of any of items 36-51, wherein the first and second electrodes consist essentially of silver.

61. The method or system of any of items 36-51, wherein the first and second electrodes consist essentially of cobalt.

62. The method or system of any of items 36-51, wherein the first and second electrodes consist essentially of nickel.

63. The method or system of any of items 36-51, wherein the first and/or second electrodes comprise particles of granular activated carbon coated with copper.

64. The method or system of any of items 36-51, wherein the first and/or second electrodes comprise particles of granular activated carbon coated with silver.

65. The method or system of any of items 36-51, wherein the first and/or second electrodes comprise particles of granular activated carbon coated with cobalt.

66. The method or system of any of items 36-51, wherein the first and/or second electrodes comprise particles of granular activated carbon coated with nickel.

67. An ammonia-based thermoelectrochemical system substantially as shown or described herein.

68. A method of use of an ammonia-based thermoelectrochemical system substantially as shown or described herein.

Any patents or publications mentioned in this specification are incorporated herein by reference to the same extent as if each individual publication is specifically and individually indicated to be incorporated by reference.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. An ammonia-based thermoelectrochemical system, comprising:
a reactor comprising a first electrode compartment and a second electrode compartment, a separator interposed between the first electrode compartment and the second electrode compartment, the reactor comprising first and second electrodes disposed in the first and second electrode compartments, respectively, both the first and the second electrode comprising at least one metal M selected from copper, silver, cobalt and nickel, the metal M in the first and the second electrode in solid form, wherein the first and second electrode both comprise the same metal M, a conductive conduit for electrons in electrical communication with the first electrode and the second electrode, the first and second electrode compartments containing an electrolyte comprising an aqueous solution of an ammonium salt and a salt of the at least one metal M, wherein the salt of the at least one metal M is a salt of the same metal M present in the first and second electrodes.

2. The system of claim 1 wherein the first and second electrodes consist essentially of copper, consist essentially of silver, consist essentially of cobalt, or consist essentially of nickel.

3. The system of claim 1 wherein the first and/or second electrodes comprise particles of granular activated carbon coated with copper, silver, cobalt or nickel.

4. The system of claim 1, wherein the reactor further comprises one or more seals to inhibit entry of oxygen into the reactor.

5. A method of use of an ammonia-based thermoelectrochemical system, comprising:
providing an ammonia-based thermoelectrochemical system, the system comprising a first electrode compartment and a second electrode compartment, a separator interposed between the first electrode compartment and the second electrode compartment, the reactor comprising first and second electrodes disposed in the first and second electrode compartments, respectively, both the first and the second electrode comprising at least one metal M selected from copper, silver, cobalt and nickel, the metal M in the first and the second electrode in solid form, wherein the first and second electrode both comprise the same metal M, a conductive conduit for electrons in electrical communication with the first electrode and the second electrode, the first and second electrode compartments containing an electrolyte comprising an aqueous solution of an ammonium salt and a salt of the at least one metal M, wherein the salt of the at least one metal M is a salt of the same metal M present in the first and second electrodes;
adding ammonia to the first electrode compartment, thereby promoting reactions in the first and second electrode compartments:
first electrode compartment: M (s)+x $NH_3$ (aq)→ $M(NH_3)_x^{y+}$(aq)+ye-,
second electrode compartment: $M^{y+}$(aq)+ye-→M (s)
where y is one or two,
wherein the reaction in the first electrode compartment produces a first spent electrolyte and the reaction in the second electrode compartment produces a second spent electrolyte, the reactions producing an electrical current.

6. The method of claim/, further comprising heating the first spent electrolyte to volatilize and remove ammonia, thereby regenerating the electrolyte and regenerating the electrode in the first electrode compartment; and
adding ammonia to the second spent electrolyte, thereby promoting reactions in the first electrode and second electrode compartments:
first electrode compartment: M (s)+x $NH_3$ (aq)→M $(NH_3)_x^{y+}$(aq)+ye-,
second electrode compartment: $M^{y+}$(aq)+ye-→M (s)
where y is one or two,
wherein the reaction in the first electrode compartment produces a first spent electrolyte and the reaction in the second electrolyte compartment produces a second spent electrolyte, the reactions producing an electrical current.

7. The method of claim 5, further comprising repeating the steps of claim 2 one or more additional times.

8. The method of claim 5, wherein the metal M is copper and the electrolyte comprises an aqueous solution of ammonium nitrate ($NH_4NO_3$) and copper nitrate ($Cu(NO_3)_2$), wherein the metal M is silver and the electrolyte comprises an aqueous solution of ammonium nitrate ($NH_4NO_3$) and silver nitrate ($AgNO_3$), or wherein the metal M is nickel and the electrolyte comprises an aqueous solution of ammonium nitrate ($NH_4NO_3$) and nickel nitrate ($Ni(NO_3)_2$).

9. The method of claim 5, wherein the first and/or second electrode is a flow electrode.

10. The method of claim 5, wherein the first electrode compartment is in flow communication with a first electrolyte reservoir.

11. The method of claim 5, wherein the second electrode compartment is in flow communication with a second electrolyte reservoir.

12. The method of claim 5, further comprising sparging the electrolyte with a non-oxygen containing gas to remove oxygen and inhibit corrosion of electrodes in the reactor.

13. A method of use of an ammonia-based thermoelectrochemical system, comprising:
providing an ammonia-based thermoelectrochemical system, the system comprising at least two cells, each cell comprising a first electrode compartment and a second electrode compartment; a separator interposed between the first electrode compartment and the second electrode compartment, wherein the first electrode compartment of each of the at least two cells is in flow communication with each other first electrode compartment and a first electrolyte reservoir and wherein the second electrode compartment of each of the at least two cells is in flow communication with each other second electrode compartment and a second electrolyte reservoir, the reactor comprising first and second electrodes disposed in the first and second electrode compartments, respectively, of each of the at least two cells, both the first and the second electrode of each of the at least two cells comprising at least one metal M selected from copper, silver, cobalt and nickel, the metal M in the first and the second electrode of each of the at least two cells in solid form, wherein the first and second electrode of each of the at least two cells both comprise the same metal M, a conductive conduit for electrons in electrical communication with the first electrode and the second electrode of each of the at least two cells, the first and second electrode compartments of each of the at least two cells containing an electrolyte comprising an aqueous solution of an ammonium salt and a salt of the at least one metal M, wherein the salt of the at least one metal M is a salt of the same metal M present in the first and second electrodes of each of the at least two cells;

adding ammonia to the first electrode compartments of each of the at least two cells, thereby promoting reactions in the first and second electrode compartments of each of the at least two cells;

first electrode compartments: $M\ (s) + x\ NH_3\ (aq) \rightarrow M(NH_3)_x^{y+}(aq) + ye-$, second electrode compartments: $M^{y+}(aq) + ye- \rightarrow M\ (s)$ where y is one or two, wherein the reaction in the first electrode compartments of each of the at least two cells produces a first spent electrolyte and the reaction in the second electrode compartments of each of the at least two cells produces a second spent electrolyte, the reactions producing an electrical current.

14. The method of claim 13, further comprising heating the first spent electrolyte to volatilize and remove ammonia, thereby regenerating the electrolyte and regenerating the electrode in the first electrode compartments of each of the at least two cells; and adding ammonia to the second spent electrolyte, thereby promoting reactions in the first and second electrode compartments of each of the at least two cells:

first electrode compartment: $M\ (s) + x\ NH_3\ (aq) \rightarrow M(NH_3)\ (aq) + ye-$, second electrode compartment: $M^{y+}(aq) + ye- \rightarrow M\ (s)$ where y is one or two, wherein the reaction in the first electrode compartments of each of the at least two cells produces a first spent electrolyte and the reaction in the second electrolyte compartments of each of the at least two cells produces a second spent electrolyte, the reactions producing an electrical current.

15. The method of claim 13, further comprising repeating the steps of claim 14 one or more additional times.

16. The method of claim 13, wherein the metal M is copper and the electrolyte comprises an aqueous solution of ammonium nitrate ($NH_4NO_3$) and copper nitrate ($Cu(NO_3)_2$) or the metal M is silver and the electrolyte comprises an aqueous solution of ammonium nitrate ($NH_4NO_3$) and silver nitrate ($AgNO_3$) or the metal M is nickel and the electrolyte comprises an aqueous solution of ammonium nitrate ($NH_4NO_3$) and nickel nitrate ($Ni(NO_3)_2$).

17. The method of claim 13, wherein the first and/or second electrode of each of the at least two cells is a flow electrode.

18. The method of claim 13, further comprising sparging the electrolyte with a non-oxygen containing gas to remove oxygen and inhibit corrosion of electrodes in the reactor.

* * * * *